(12) United States Patent
Yoshino et al.

(10) Patent No.: US 11,818,824 B2
(45) Date of Patent: Nov. 14, 2023

(54) INDUCTION HEATING COOKING APPARATUS

(71) Applicant: Mitsubishi Electric Corporation, Tokyo (JP)

(72) Inventors: Hayato Yoshino, Tokyo (JP); Jun Bunya, Tokyo (JP); Takeshi Iida, Tokyo (JP); Ikuro Suga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 447 days.

(21) Appl. No.: 16/967,570

(22) PCT Filed: Feb. 23, 2018

(86) PCT No.: PCT/JP2018/006696
§ 371 (c)(1),
(2) Date: Aug. 5, 2020

(87) PCT Pub. No.: WO2019/163089
PCT Pub. Date: Aug. 29, 2019

(65) Prior Publication Data
US 2021/0227645 A1    Jul. 22, 2021

(51) Int. Cl.
*H05B 6/06*  (2006.01)
*H05B 6/12*  (2006.01)

(52) U.S. Cl.
CPC .......... *H05B 6/065* (2013.01); *H05B 6/1245* (2013.01); *H05B 6/1272* (2013.01); *H05B 2213/05* (2013.01)

(58) Field of Classification Search
CPC .... H05B 6/065; H05B 6/1245; H05B 6/1272; H05B 2213/05
See application file for complete search history.

(56) References Cited

U.S. PATENT DOCUMENTS

| | | | |
|---|---|---|---|
| 2009/0120928 A1* | 5/2009 | Lee ........................ | H05B 6/062 219/626 |
| 2014/0151365 A1* | 6/2014 | Oh ......................... | H05B 6/065 219/662 |

(Continued)

FOREIGN PATENT DOCUMENTS

| EP | 2 693 837 A1 | 2/2014 |
|---|---|---|
| EP | 2833697 A1 | 2/2015 |

(Continued)

OTHER PUBLICATIONS

International Search Report of the International Searching Authority dated May 15, 2018 for the corresponding International application No. PCT/JP2018/006696 (and English translation).

(Continued)

*Primary Examiner* — William J Levicky
*Assistant Examiner* — Keith Brian Assante
(74) *Attorney, Agent, or Firm* — POSZ LAW GROUP, PLC

(57) ABSTRACT

An induction heating cooking apparatus includes a plurality of heating coils aligned in at least one row on a flat surface, a plurality of inverter circuits each configured to supply a high-frequency current to the corresponding one of the plurality of heating coils, and a controller configured to control driving of the plurality of inverter circuits. The plurality of heating coils include a first heating coil and a second heating coil that are adjacent to each other. The controller is configured to, when a material forming a heating target loaded on an upper part of the first heating coil is a magnetic material, and a material forming the heating target loaded on an upper part of the second heating coil at least includes a nonmagnetic material, set a frequency of the high-frequency current supplied to the second heating coil (Continued)

higher than a frequency of the high-frequency current supplied to the first heating coil.

9 Claims, 17 Drawing Sheets

(56) References Cited

U.S. PATENT DOCUMENTS

| | | | | |
|---|---|---|---|---|
| 2018/0146514 A1* | 5/2018 | Jeanneteau | ............ | H05B 6/065 |
| 2018/0358874 A1* | 12/2018 | Otsu | ...................... | H02K 17/14 |

FOREIGN PATENT DOCUMENTS

| | | | | |
|---|---|---|---|---|
| EP | 3 285 546 A1 | 2/2018 | | |
| JP | H08-078148 A | 3/1996 | | |
| JP | 2011-003491 A | 1/2011 | | |
| JP | 2012-243497 A | 12/2012 | | |
| JP | 5213937 B2 | 6/2013 | | |
| JP | 2013-218942 A | 10/2013 | | |
| JP | 2018014238 A1 * | 7/2016 | ............ | H05B 6/062 |
| JP | 2016-207255 A | 12/2016 | | |
| JP | 2016207255 A1 * | 12/2016 | ............ | H05B 6/065 |
| JP | 2018-014238 A | 1/2018 | | |
| WO | 2012/132274 A1 | 10/2012 | | |
| WO | WO-2015159451 A1 * | 10/2015 | ............ | H05B 6/065 |

OTHER PUBLICATIONS

European Search Report dated Feb. 2, 2021, issued in corresponding EP Patent Application No. 18907441.2.

* cited by examiner

FIG. 16

|  | MATERIAL | FIRST ACTION (a) | SECOND ACTION (b) |
|---|---|---|---|
| FIRST HEATING COIL | INCLUDING NONMAGNETIC MATERIAL | STOP | HIGH FREQUENCY ENERGIZATION |
| SECOND HEATING COIL | MAGNETIC MATERIAL | LOW FREQUENCY ENERGIZATION | STOP |
| THIRD HEATING COIL | INCLUDING NONMAGNETIC MATERIAL | STOP | HIGH FREQUENCY ENERGIZATION |
| FOURTH HEATING COIL | NO LOAD | STOP | STOP |

FIG. 18

|  | MATERIAL | FIRST ACTION (c) | SECOND ACTION (d) |
|---|---|---|---|
| FIRST HEATING COIL | INCLUDING NONMAGNETIC MATERIAL | STOP | HIGH FREQUENCY ENERGIZATION |
| SECOND HEATING COIL | MAGNETIC MATERIAL | LOW FREQUENCY ENERGIZATION | STOP |
| THIRD HEATING COIL | MAGNETIC MATERIAL | LOW FREQUENCY ENERGIZATION | STOP |
| FOURTH HEATING COIL | INCLUDING NONMAGNETIC MATERIAL | STOP | HIGH FREQUENCY ENERGIZATION |

FIG. 20

|  | MATERIAL | THIRD ACTION (a) | FOURTH ACTION (b) |
|---|---|---|---|
| FIRST HEATING COIL | INCLUDING NONMAGNETIC MATERIAL | LOW FREQUENCY ENERGIZATION | HIGH FREQUENCY ENERGIZATION |
| SECOND HEATING COIL | MAGNETIC MATERIAL | LOW FREQUENCY ENERGIZATION | HIGH FREQUENCY ENERGIZATION |
| THIRD HEATING COIL | INCLUDING NONMAGNETIC MATERIAL | LOW FREQUENCY ENERGIZATION | HIGH FREQUENCY ENERGIZATION |
| FOURTH HEATING COIL | NO LOAD | STOP | STOP |

FIG. 22

|  | MATERIAL | THIRD ACTION (c) | FOURTH ACTION (d) |
|---|---|---|---|
| FIRST HEATING COIL | INCLUDING NONMAGNETIC MATERIAL | LOW FREQUENCY ENERGIZATION | HIGH FREQUENCY ENERGIZATION |
| SECOND HEATING COIL | MAGNETIC MATERIAL | LOW FREQUENCY ENERGIZATION | HIGH FREQUENCY ENERGIZATION |
| THIRD HEATING COIL | MAGNETIC MATERIAL | LOW FREQUENCY ENERGIZATION | HIGH FREQUENCY ENERGIZATION |
| FOURTH HEATING COIL | INCLUDING NONMAGNETIC MATERIAL | LOW FREQUENCY ENERGIZATION | HIGH FREQUENCY ENERGIZATION |

INDUCTION HEATING COOKING APPARATUS

CROSS REFERENCE TO RELATED APPLICATION

This application is a U.S. national stage application of International Application No. PCT/JP2018/006696, filed on Feb. 23, 2018, the contents of which are incorporated herein by reference.

TECHNICAL FIELD

The present disclosure relates to an induction heating cooking apparatus having a plurality of heating coils.

BACKGROUND

Some induction heating cooking apparatus has been proposed, having a plurality of heating coils, in which the heating coil on which no heating target is loaded is supplied with electric power smaller than electric power supplied to the heating coil on which a heating target is loaded (for example, see Patent Literature 1).

PATENT LITERATURE

Patent Literature 1: Japanese Patent No. 5213937

Some heating targets to be heated by an induction heating cooking apparatus are made of a composite where magnetic metal is attached to nonmagnetic metal. An example of such a heating target is a "layered frying pan" where magnetic metal, such as stainless steel, is attached to the center portion of the bottom of a frying pan made of a nonmagnetic aluminum material. In a typical heating target made of a composite, a magnetic material is attached to the flat center portion of the bottom surface of a nonmagnetic material, but a curved outer peripheral portion of the bottom surface has no magnetic material.

In the induction heating cooking apparatus disclosed in Patent Literature 1, power distribution for each of the heating coils is changed depending on the outer diameter of the heating target, but no control is performed depending on a material forming the heating target. Therefore, in inductively heating the heating target made of a composite, there is a problem where induction heating suitable for the material forming the heating target cannot be performed, so that unevenness in heating temperature occurs.

SUMMARY

An object of the present disclosure, which has been made to solve the above problems, is to obtain an induction heating cooking apparatus where unevenness in heating temperature can be reduced in inductively heating a heating target made of a composite.

An induction heating cooking apparatus according to an embodiment of the present disclosure includes a plurality of heating coils aligned in at least one row on a flat surface, a plurality of inverter circuits each configured to supply a high-frequency current to the corresponding one of the plurality of heating coils, a material determiner configured to determine a material forming a heating target loaded on an upper part of each of the plurality of heating coils, and a controller configured to control driving of the plurality of inverter circuits on the basis of a result determined by the material determiner. The plurality of heating coils includes a first heating coil and a second heating coil that are adjacent to each other. The controller is configured to, when the material forming the heating target loaded on the upper part of the first heating coil at least includes a nonmagnetic material, and the material forming the heating target loaded on the upper part of the second heating coil is a magnetic material, set a frequency of the high-frequency current supplied to the first heating coil higher than a frequency of the high-frequency current supplied to the second heating coil.

According to an embodiment of the present disclosure, in inductively heating a heating target made of a composite, it is possible to perform induction heating suitable for the material forming the heating target so that unevenness in heating temperature can be reduced.

BRIEF DESCRIPTION OF DRAWINGS

FIG. 16 is a table for describing heating actions of the induction heating cooking apparatus according to Embodiment 2.

FIG. 18 is a table for describing the heating actions of the induction heating cooking apparatus according to Embodiment 2.

FIG. 20 is a table for describing heating actions of an induction heating cooking apparatus according to Embodiment 3.

FIG. 22 is a table for describing the heating actions of the induction heating cooking apparatus according to Embodiment 3.

DETAILED DESCRIPTION

Embodiment 1

(Configuration)

Figure 1:
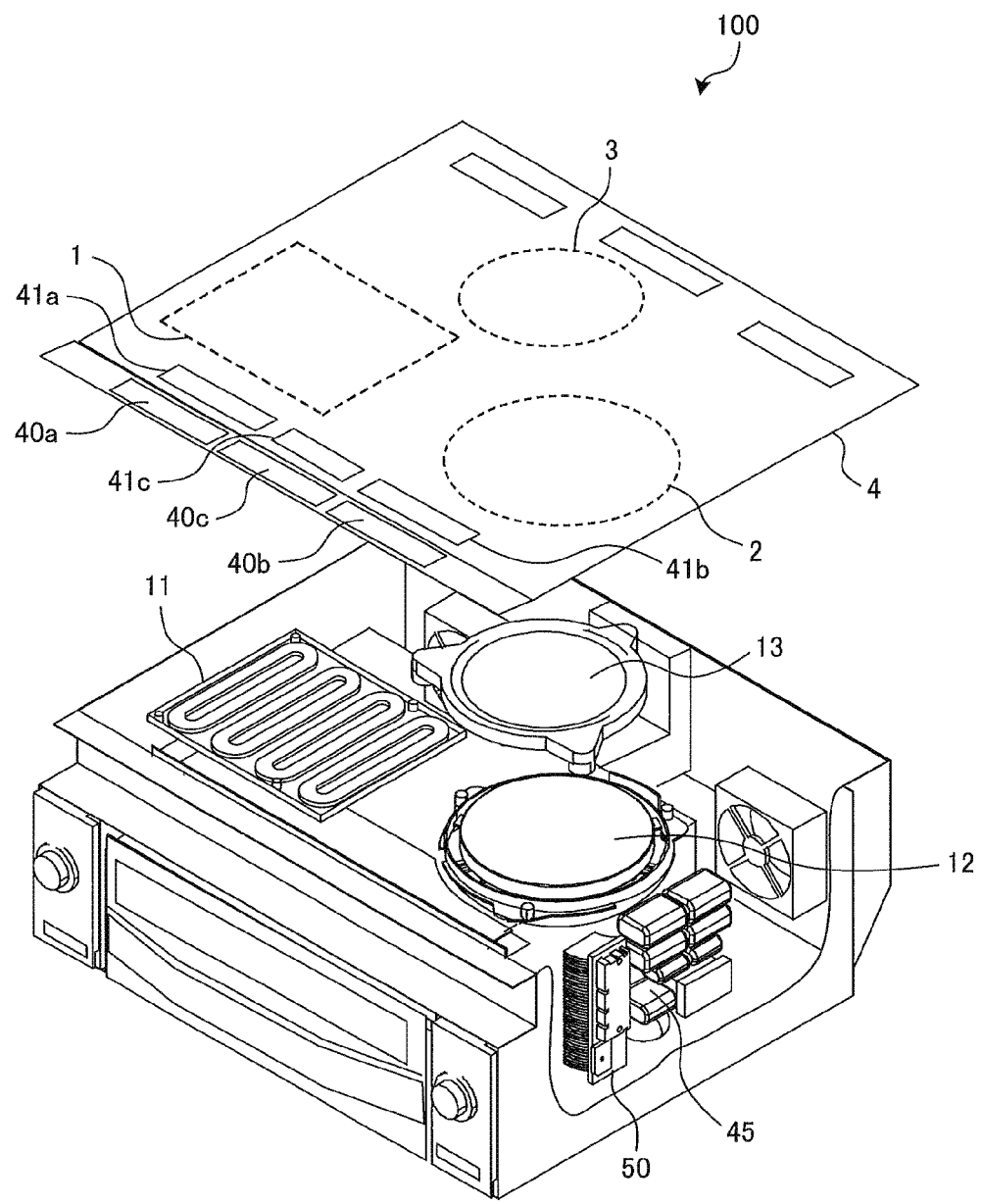
FIG. 1 is an exploded perspective view showing an induction heating cooking apparatus according to Embodiment 1.

FIG. 1 is an exploded perspective view showing an induction heating cooking apparatus according to Embodiment 1.

Figure 2:
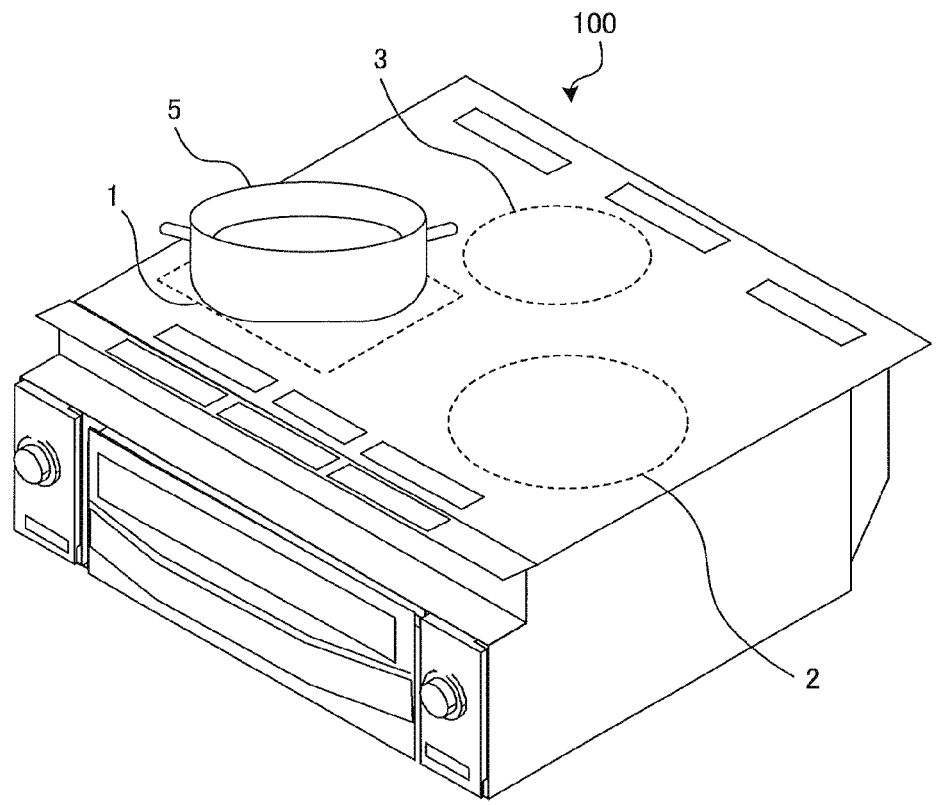
FIG. 2 is a perspective view showing a heating target and the induction heating cooking apparatus according to Embodiment 1.

FIG. 2 is a perspective view showing a heating target and the induction heating cooking apparatus according to Embodiment 1.

As shown in FIG. 1 and FIG. 2, an induction heating cooking apparatus 100 includes a top plate 4 at the upper part of the induction heating cooking apparatus 100, and a heating target 5, such as a pot, is loaded on the top plate 4. The top plate 4 includes a first induction heating zone 1 and a second induction heating zone 2 as heating zones for inductively heating the heating target 5. The first induction heating zone 1 and the second induction heating zone 2 are laterally arranged adjacent to each other in an area close to a front edge of the top plate 4. The induction heating cooking apparatus 100 according to Embodiment 1 also includes a third induction heating zone 3 as a third heating zone. The third induction heating zone 3 is provided behind the first induction heating zone 1 and the second induction heating zone 2 and at a substantial center position in the lateral direction of the top plate 4.

Under the first induction heating zone 1, the second induction heating zone 2, and the third induction heating zone 3, a first induction heating unit 11, a second induction heating unit 12, and a third induction heating unit 13 are respectively provided each of which heats the heating target 5 loaded on the corresponding heating zone. Each heating unit is made of heating coils.

The entire top plate 4 is made of an infrared transmitting material, such as heat-resistant toughened glass and crystallized glass. A rectangular position mark roughly indicating a position where the heating target 5 is to be loaded is formed on the top plate 4 by painting, printing, or other method corresponding to the heating area of the first induction heating unit 11. Circular position marks each roughly indicating a position where the heating target 5 is to be loaded are also formed on the top plate 4 by painting, printing, or other method corresponding to respective heating areas of the second induction heating unit 12 and the third induction heating unit 13.

An operation unit 40 is provided at a position close to the front edge of the top plate 4. The operation unit 40 is used as an input device for setting electric power to be input, a cooking menu and other setting when the heating target 5 is heated by the first induction heating unit 11, the second induction heating unit 12, and the third induction heating unit 13. In Embodiment 1, the operation unit 40 is divided into an operation unit 40a, an operation unit 40b, and an operation unit 40c, which are provided for the respective induction heating units.

Further, a display unit 41 is provided, as a notification unit, close to the operation unit 40. The display unit 41 displays information, such as an action state of each of the induction heating units, and details of an operation and an input from the operation unit 40. In Embodiment 1, the display unit 41 is divided into a display unit 41a, a display unit 41b, and a display unit 41c, which are provided for the respective induction heating units.

It should be noted that the operation unit 40 and the display unit 41 are not particularly limited to the above-described case where the operation unit 40 and the display unit 41 are divided for each induction heating unit and the case where each of the operation unit 40 and the display unit 41 is shared by the induction heating units. The operation unit 40 is, for example, a mechanical switch, such as a push switch and a tactile switch, or a touch switch that detects an input operation on the basis of a change in electrode capacitance. Further, the display unit 41 is, for example, an LCD, an LED or other device.

The operation unit 40 and the display unit 41 may be formed into an integral body to form an operation and display unit 43. The operation and display unit 43 is, for example, a touch panel or other device where a touch switch is provided on the upper surface of an LCD.

Note that LCD is an abbreviation for liquid crystal device. LED is an abbreviation for light emitting diode.

The induction heating cooking apparatus 100 houses drive circuits 50 configured to supply high-frequency power to coils of the first induction heating unit 11, the second induction heating unit 12, and the third induction heating unit 13. The induction heating cooking apparatus 100 also houses a control unit 45 for controlling an action of the entire induction heating cooking apparatus 100 including the drive circuits 50.

When high-frequency power is supplied to the first induction heating unit 11, the second induction heating unit 12, and the third induction heating unit 13 by the drive circuits 50, a high-frequency magnetic field is generated from the heating coils of the respective induction heating units. The drive circuit 50 is provided for each heating unit. The drive circuits 50 may have the same circuit configuration, or may have different circuit configurations for the respective heating units. A detailed configuration of the drive circuit 50 will be described later.

Figure 3:
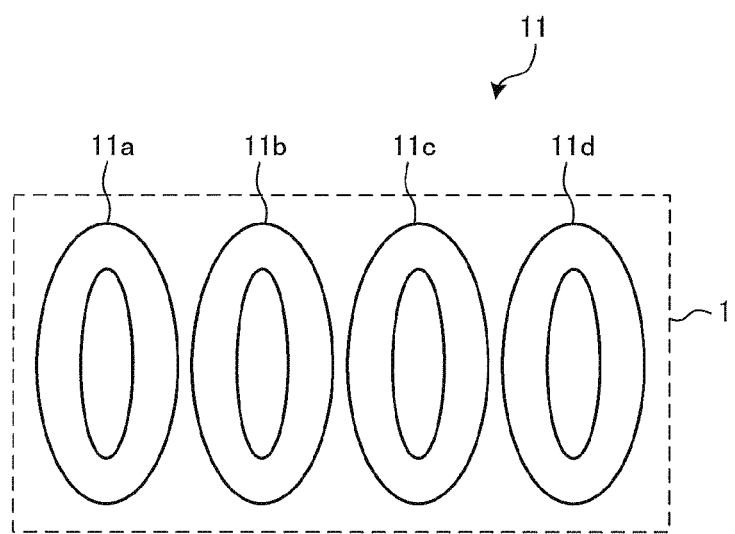
FIG. 3 is a plan view showing a first induction heating unit of the induction heating cooking apparatus according to Embodiment 1.

FIG. 3 is a plan view showing the first induction heating unit of the induction heating cooking apparatus according to Embodiment 1.

The first induction heating unit 11 includes a plurality of heating coils aligned in one row on a flat surface. FIG. 3 shows an example where the first induction heating unit 11 includes four heating coils that are a first heating coil 11a, a second heating coil 11b, a third heating coil 11c, and a fourth heating coil 11d. The first heating coil 11a to the fourth heating coil 11d are aligned in one row in the lateral direction of the top plate 4, for example.

Each of the first heating coil 11a to the fourth heating coil 11d is formed by winding a conductive wire made of insulation-coated metal. Arbitrary metal, such as copper and aluminum, for example, may be used for the conductive wire. Each of the first heating coil 11a to the fourth heating coil 11d is formed in such a manner that a conductive wire is independently wound.

Each of the first heating coil 11a to the fourth heating coil 11d is formed in an elliptical shape, for example, as viewed in a plan view. The first heating coil 11a to the fourth heating coil 11d have an identical shape and an identical size. Being the identical shape and the identical size is not limited to the case of being an exactly identical shape and an exactly identical size, and includes the case of having a margin of error caused by a manufacturing error or other errors, and also includes the case of being a substantially identical shape and a substantially identical size.

Figure 4:
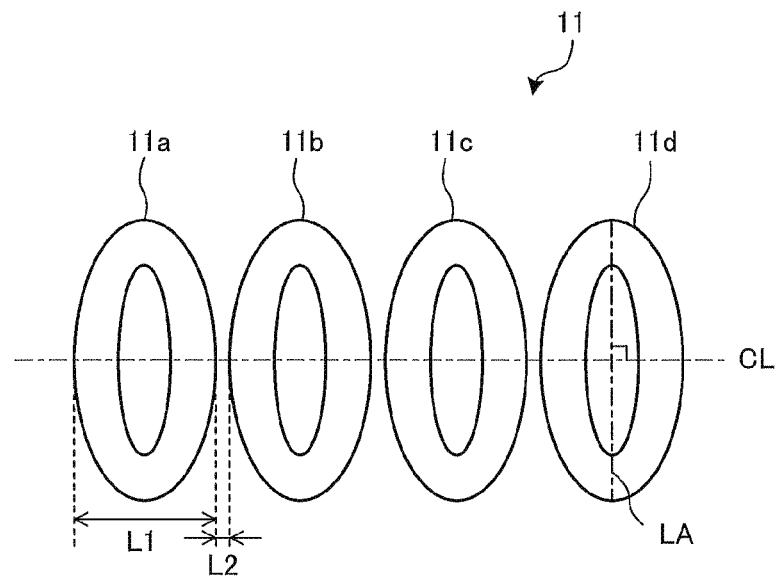
FIG. 4 is a plan view for describing an arrangement in the first induction heating unit of the induction heating cooking apparatus according to Embodiment 1.

FIG. 4 is a plan view for describing an arrangement in the first induction heating unit of the induction heating cooking apparatus according to Embodiment 1.

As shown in FIG. 4, minor axes of elliptical shapes of the first heating coil 11a to the fourth heating coil 11d are aligned on a straight line CL. In other words, the first heating coil 11a to the fourth heating coil 11d are aligned in one row in such a manner that major axes LA of the elliptical shapes are orthogonal to the straight line CL. Further, the first heating coil 11a to the fourth heating coil 11d are arranged in such a manner that an interval L2 between two heating coils that are adjacent to each other is smaller than a half of a length L1 of the minor axis of the heating coil.

In the description made hereinafter, the first heating coil 11a, the second heating coil 11b, the third heating coil 11c, and the fourth heating coil 11d may be collectively referred to as respective heating coils.

Each of the second induction heating unit 12 and the third induction heating unit 13 is configured in such a manner that a plurality of circular heating coils having different diameters are concentrically arranged. Each of the plurality of circular heating coils is formed by winding a conductive wire made of insulation-coated metal. Arbitrary metal, such as copper and aluminum, for example, may be used for the conductive wire.

In Embodiment 1, the description will be made for a configuration where the first induction heating unit 11 includes the plurality of elliptical heating coils aligned in one row on a flat surface, and each of the second induction heating unit 12 and the third induction heating unit 13 includes the plurality of circular heating coils concentrically arranged. However, the present disclosure is not limited to such a configuration. For example, at least one of the second induction heating unit 12 and the third induction heating unit 13 may have the configuration similar to that of the first induction heating unit 11.

In the description made hereinafter, the configuration and action relating to the first induction heating unit 11 will be described.

Figure 5:
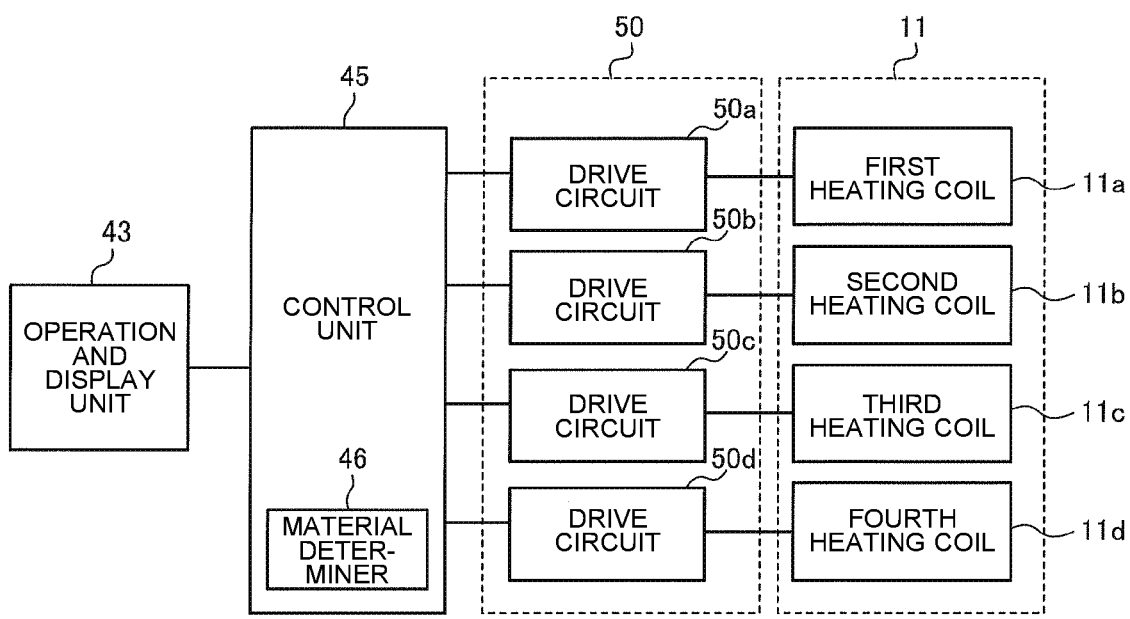
FIG. 5 is a block diagram showing a configuration of the induction heating cooking apparatus according to Embodiment 1.

FIG. 5 is a block diagram showing a configuration of the induction heating cooking apparatus according to Embodiment 1.

As shown in FIG. 5, the first induction heating unit 11 is driven and controlled by a drive circuit 50a, a drive circuit 50b, a drive circuit 50c, and a drive circuit 50d. The first heating coil 11a is driven and controlled by the drive circuit 50a. The second heating coil 11b is driven and controlled by the drive circuit 50b. The third heating coil 11c is driven and controlled by the drive circuit 50c. The fourth heating coil 11d is driven and controlled by the drive circuit 50d.

When a high-frequency current is supplied from the drive circuit 50a to the first heating coil 11a, a high-frequency magnetic field is generated from the first heating coil 11a. When a high-frequency current is supplied from the drive circuit 50b to the second heating coil 11b, a high-frequency magnetic field is generated from the second heating coil 11b. When a high-frequency current is supplied from the drive circuit 50c to the third heating coil 11c, a high-frequency magnetic field is generated from the third heating coil 11c. When a high-frequency current is supplied from the drive circuit 50d to the fourth heating coil 11d, a high-frequency magnetic field is generated from the fourth heating coil 11d.

The control unit 45 is dedicated hardware or a CPU that executes a program stored in a memory. The control unit 45 includes a material determiner 46 configured to determine a material forming the heating target 5 loaded on the upper part of each of the first heating coil 11a, the second heating coil 11b, the third heating coil 11c, and the fourth heating coil 11d of the first induction heating unit 11.

Note that CPU is an abbreviation for central processing unit. CPU is also referred to as a central processor, a processing unit, or an arithmetic unit.

In the case where the control unit 45 is dedicated hardware, the control unit 45 corresponds to, for example, a single circuit, a composite circuit, an ASIC, an FPGA, or a combination of these circuits. Each functional unit implemented by the control unit 45 may be implemented by individual hardware, or the respective functional units may be implemented by single hardware.

Note that ASIC is an abbreviation for application specific integrated circuit. FPGA is an abbreviation for field-programmable gate array.

In the case where the control unit 45 is a CPU, each function to be implemented by the control unit 45 is implemented by software, firmware or a combination of software and firmware. The software and firmware are described as a program, and are stored in the memory. The CPU reads and executes the program stored in the memory, thus implementing each function of the control unit 45. The memory is, for example, a non-volatile or volatile semiconductor memory, such as RAM, ROM, a flash memory, an EPROM, and an EEPROM.

Note that some functions of the control unit 45 may be implemented by dedicated hardware, while other functions of the control unit 45 may be implemented by software or firmware.

Note that RAM is an abbreviation for random access memory. ROM is an abbreviation for read only memory. EPROM is an abbreviation for erasable programmable read only memory. EEPROM is an abbreviation for electrically erasable programmable read-only memory.

Figure 6:
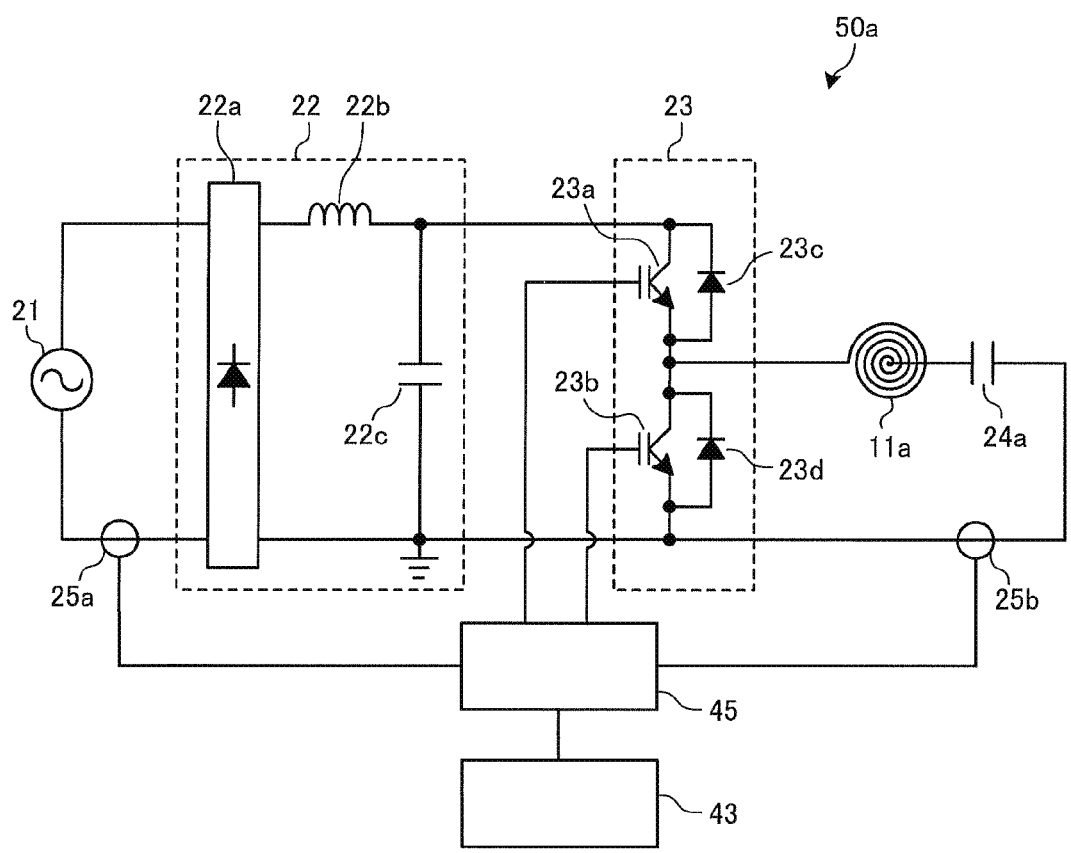
FIG. 6 is a diagram showing a drive circuit of the induction heating cooking apparatus according to Embodiment 1.

FIG. 6 is a diagram showing a drive circuit of the induction heating cooking apparatus according to Embodiment 1.

Note that the drive circuit 50a to the drive circuit 50d may have the same circuit configuration, or may have different circuit configurations for the respective heating coils. FIG. 6 shows the drive circuit 50a that drives the first heating coil 11a.

As shown in FIG. 6, the drive circuit 50a includes a DC power supply circuit 22, an inverter circuit 23, and a resonant capacitor 24a.

The DC power supply circuit 22 includes a diode bridge 22a, a reactor 22b, and a smoothing capacitor 22c. The DC power supply circuit 22 converts an AC voltage input from an AC power supply 21 into a DC voltage, and outputs the DC voltage to the inverter circuit 23.

In the inverter circuit 23, an IGBT 23a and an IGBT 23b used as switching elements are connected in series to an output of the DC power supply circuit 22. In the inverter circuit 23, a diode 23c and a diode 23d used as flywheel diodes are respectively connected in parallel to the IGBT 23a and the IGBT 23b. The inverter circuit 23 is a half-bridge type inverter.

The IGBT 23a and the IGBT 23b are driven to be turned on and off in response to drive signals output from the control unit 45. The control unit 45 outputs drive signals for alternately turning on and off the IGBT 23a and the IGBT 23b, so that the IGBT 23b is brought into an off state during a period where the IGBT 23a is brought into an on state, while the IGBT 23b is brought into an on state during a period where the IGBT 23a is brought into an off state. In this manner, the inverter circuit 23 converts DC power output from the DC power supply circuit 22 into AC power at a high frequency of approximately 20 kHz to approximately 100 kHz, and supplies the power to a resonant circuit made of the first heating coil 11a and the resonant capacitor 24a.

The resonant capacitor 24a is connected in series to the first heating coil 11a. The resonant circuit made of the first heating coil 11a and the resonant capacitor 24a has a resonant frequency that depends on the inductance of the first heating coil 11a and the capacitance of the resonant capacitor 24a. Note that the inductance of the first heating coil 11a changes depending on a characteristic of a metal load when the heating target 5, which is the metal load, is magnetically coupled to the first heating coil 11a, and the resonant frequency of the resonant circuit changes depending on the change in the inductance of the first heating coil 11a.

When a high-frequency current is supplied to the first heating coil 11a, the heating target 5 loaded on the top plate 4 immediately above the first heating coil 11a is inductively heated by a high-frequency magnetic flux generated by the high-frequency current flowing through the first heating coil 11a.

Note that each of the IGBT 23a and the IGBT 23b used as the switching elements is a silicon-based semiconductor, for example. However, each of the IGBT 23a and the IGBT 23b may be made of a wide-bandgap semiconductor, such as a silicon carbide-based material and a gallium nitride-based material.

With the use of the wide-bandgap semiconductors for the switching elements, power supply loss of the switching elements can be reduced. Further, as heat dissipation from the drive circuit 50a is satisfactory even when the driving frequency is set to be high frequency, that is, even when switching is performed at a high speed, radiation fins in the drive circuit 50 can be reduced in size, so that the drive circuit 50a can be reduced in size and cost.

Further, the drive circuit 50a includes an input current detecting unit 25a and a coil current detecting unit 25b. The input current detecting unit 25a is, for example, a current sensor. The input current detecting unit 25a detects an electric current input from the AC power supply 21 into the DC power supply circuit 22, and outputs a voltage signal corresponding to a value of the input current to the control unit 45. The coil current detecting unit 25b is, for example, a current sensor. The coil current detecting unit 25b detects an electric current flowing through the first heating coil 11a, and outputs a voltage signal corresponding to a value of the coil current to the control unit 45.

(Action)

Next, an action of the induction heating cooking apparatus of Embodiment 1 will be described.

When a user loads the heating target 5 on the first induction heating zone 1, and instructs the operation and display unit 43 to start heating, the material determiner 46 of the control unit 45 performs a material determination process.

Figure 7:
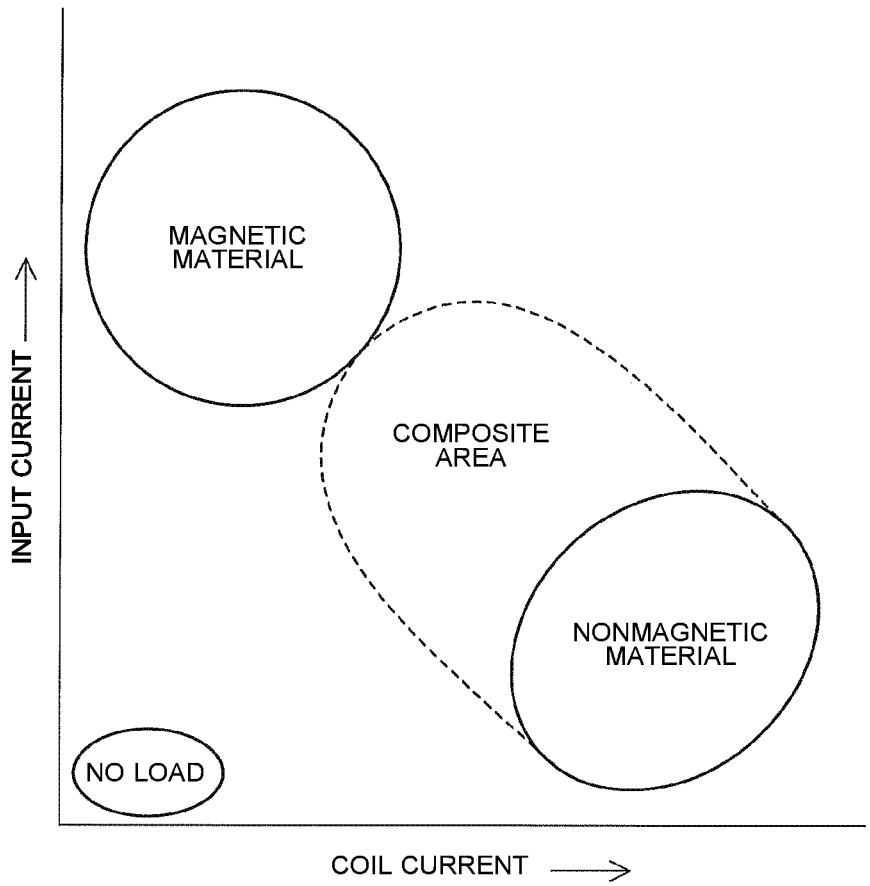
FIG. 7 is a material determining characteristic graph based on a relationship between a coil current and an input current in the induction heating cooking apparatus according to Embodiment 1.

FIG. 7 is a material determining characteristic graph based on a relationship between a coil current and an input current in the induction heating cooking apparatus according to Embodiment 1.

As shown in FIG. 7, the relationship between a coil current and an input current changes depending on a material forming the heating target 5 loaded on the upper part of each of the first heating coil 11a to the fourth heating coil 11d. The control unit 45 stores in advance in the memory a material determining table, which is a table of the relationship between the coil current and the input current shown in FIG. 7.

In the material determination process, the control unit 45 drives the inverter circuit 23 of each of the drive circuit 50a to the drive circuit 50d in response to a specific drive signal for determining a material. The control unit 45 detects an input current from the signal output from the input current detecting unit 25a. At the same time, the control unit 45 also detects a coil current from the signal output from the coil current detecting unit 25b. The material determiner 46 of the control unit 45 determines a material forming the heating target 5 loaded on the upper part of each of the heating coils on the basis of the detected coil current and input current, and the material determining table showing the relationship shown in FIG. 7.

The material forming the heating target 5 is roughly classified into a magnetic material, such as iron and stainless steel, and a nonmagnetic material, such as aluminum and copper. Some heating targets 5 are made of a composite where a magnetic material is attached to a nonmagnetic material.

Figure 8:
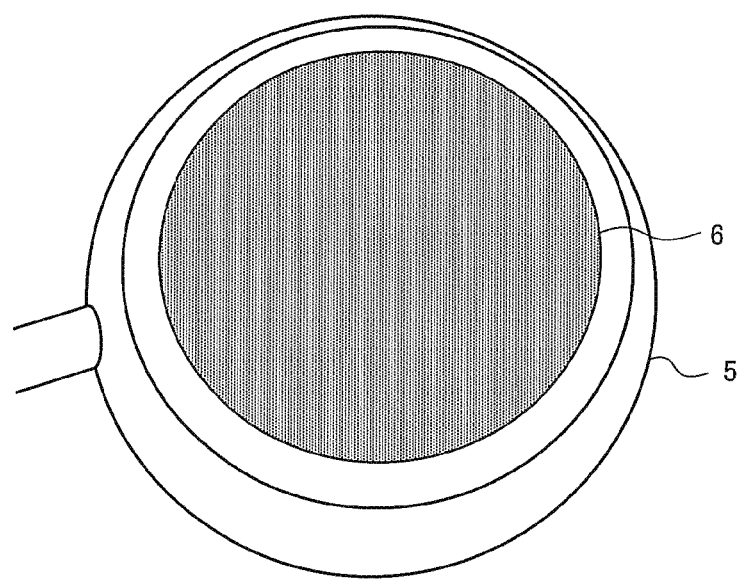
FIG. 8 is a diagram showing a heating target that is made of a composite and that is to be inductively heated by the induction heating cooking apparatus according to Embodiment 1.

FIG. 8 is a diagram showing a heating target that is made of a composite and that is to be inductively heated by the induction heating cooking apparatus according to Embodiment 1. FIG. 8 is a diagram showing the heating target 5 as viewed from a bottom surface of the heating target 5.

As shown in FIG. 8, the heating target 5 made of a composite is formed by, for example, attaching a magnetic material 6, such as stainless steel, to the center portion of the bottom of a frying pan made of a nonmagnetic material, such as aluminum. The magnetic material 6 is attached to the nonmagnetic material by any method, such as sticking, welding, thermal spraying, pressure bonding, fitting, clinching, and embedding, for example.

In the typical heating target 5 made of a composite, the magnetic material 6 is attached to the flat center portion of the bottom surface of a base made of a nonmagnetic material, but the magnetic material 6 is not attached to a curved outer peripheral portion of the bottom surface. When such a heating target 5 made of a composite is loaded on the heating zone, the magnetic material and the nonmagnetic material are loaded on the upper parts of the heating coils. More specifically, in the material determination, the material characteristic of the heating coil having the upper part on which the magnetic material and the nonmagnetic material are loaded corresponds to a characteristic of a "composite area" between the characteristic of a magnetic material and the characteristic of a nonmagnetic material as shown in FIG. 7.

Next, the control unit 45 controls the drive circuit 50a to the drive circuit 50d on the basis of a result of the material determination process to perform a heating action of supplying high-frequency power corresponding to heating power at which induction heating is performed.

Hereinafter, the description will be made separately for a heating action performed in the case where the heating target 5 made of a composite is loaded on the first induction heating zone 1 of the induction heating cooking apparatus 100 and for a heating action performed in the case where the heating target 5 made only of a magnetic material is loaded on the first induction heating zone 1 of the induction heating cooking apparatus 100.

<Heating Target 5 Made of Composite>

Hereinafter, the heating action performed in the case where the heating target 5 made of a composite is loaded on the first induction heating zone 1 will be described separately for the case where the heating target 5 having an intermediate diameter size is loaded and for the case where the heating target 5 having a large diameter size is loaded.

The size of the heating target 5 loaded on the upper parts of three heating coils out of the first heating coil 11a to the fourth heating coil 11d is referred to as "intermediate diameter", and the size of the heating target 5 loaded on the upper parts of the four heating coils is referred to as "large diameter".

(Intermediate Diameter)

Figure 9:
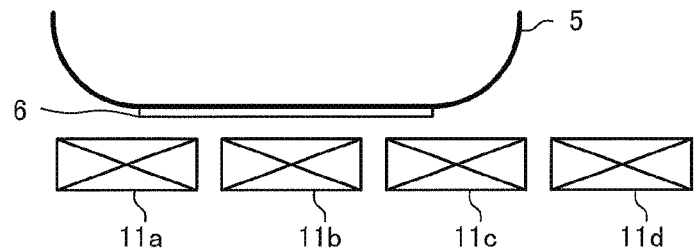
FIG. 9 is a diagram showing the heating target and heating coils of the induction heating cooking apparatus according to Embodiment 1.

FIG. 9 is a diagram showing the heating target and the heating coils of the induction heating cooking apparatus according to Embodiment 1. FIG. 9 schematically shows the longitudinal section of a state where the heating target 5 made of a composite is loaded on the heating zone. The illustration of the top plate 4 is omitted in FIG. 9.

In the case where the heating target 5 having an intermediate diameter size and made of a composite is loaded on the heating zone of the induction heating cooking apparatus 100 as shown in FIG. 9, the material determiner 46 determines that the magnetic material 6 is loaded on a part of the upper part of the first heating coil 11a, while a nonmagnetic material is loaded on other parts of the upper part of the first heating coil 11a. The material determiner 46 also determines that the magnetic material 6 is loaded on the upper part of the second heating coil 11b. The material determiner 46 also determines that the magnetic material 6 is loaded on a part of the upper part of the third heating coil 11c, while a nonmagnetic material is loaded on other parts of the upper part of the third heating coil 11c. The material determiner 46 also determines that no heating target 5 is loaded on the upper part of the fourth heating coil 11d.

In other words, the material determiner 46 determines that the heating target 5 is loaded on the upper parts of the first heating coil 11a to the third heating coil 11c, and the material forming the heating target 5 is a composite.

The material forming the heating target 5 loaded on the upper part of the heating coil and determined by the material determiner 46 is a material forming the heating target 5 immediately above the coil. For example, in the case of the heating target 5 made of a composite shown in FIG. 9, the magnetic material 6 is loaded immediately above the second heating coil 11b, and a nonmagnetic material forming the base of the heating target 5 is loaded on the magnetic material 6. In this case, the material determiner 46 determines that the material forming the heating target 5 loaded on the upper part of the second heating coil 11b is the magnetic material 6.

Figure 10:
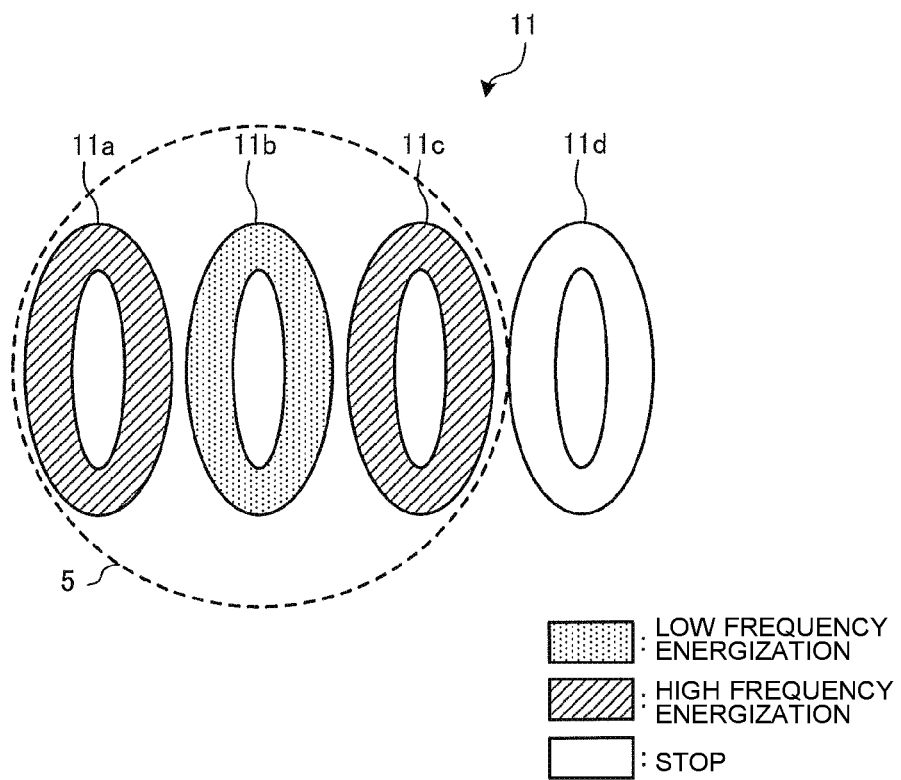
FIG. 10 is a plan view schematically showing energization states of the heating coils of the induction heating cooking apparatus according to Embodiment 1.

FIG. 10 is a plan view schematically showing energization states of the heating coils of the induction heating cooking apparatus according to Embodiment 1.

When the material forming the heating target 5 loaded on the upper part of the first heating coil 11a and the upper part of the third heating coil 11c at least includes a nonmagnetic material, and the material forming the heating target 5 loaded on the upper part of the second heating coil 11b is the magnetic material 6, the control unit 45 performs the following action.

The control unit 45 causes the drive circuit 50a, the drive circuit 50b, and the drive circuit 50c to operate, whereas the control unit 45 stops the action of the drive circuit 50d. In other words, the control unit 45 supplies a high-frequency current to the first heating coil 11a to the third heating coil 11c having the upper parts on which the heating target 5 is loaded, whereas the control unit 45 stops supply of a high-frequency current to the fourth heating coil 11d having the upper part on which no heating target 5 is loaded.

Further, the control unit 45 sets the frequency of the high-frequency current supplied from the drive circuit 50a to the first heating coil 11a and the frequency of the high-frequency current supplied from the drive circuit 50c to the third heating coil 11c higher than the frequency of the high-frequency current supplied from the drive circuit 50b to the second heating coil 11b.

For example, the control unit 45 sets the frequency of the high-frequency current supplied from the drive circuit 50a to the first heating coil 11a and the frequency of the high-frequency current supplied from the drive circuit 50c to the third heating coil 11c to a frequency corresponding to a nonmagnetic material, for example, to 90 kHz. The control unit 45 also sets the frequency of the high-frequency current supplied from the drive circuit 50b to the second heating coil 11b to a frequency corresponding to a magnetic material, for example, to 25 kHz.

The control unit 45 controls the heating power (electric power) by changing the on-duty ratio (on-off ratio) of the switching element of each inverter circuit 23. With such control, the heating target 5 placed on the top plate 4 is inductively heated.

For the following reasons, the frequency of the high-frequency current supplied from the drive circuit 50a to the first heating coil 11a and the frequency of the high-frequency current supplied from the drive circuit 50c to the third heating coil 11c are set higher than the frequency of the high-frequency current supplied to the second heating coil 11b.

That is, to inductively heat a nonmagnetic material made of aluminum or other material, it is necessary to reduce the skin depth of an eddy current to be generated in the heating target 5 to reduce the penetration volume to increase the impedance of the electric current. Therefore, a high-frequency current of 50 kHz or more and 100 kHz or less, for example, is supplied to the first heating coil 11a and the third heating coil 11c having the upper parts on which the heating target formed by the material including a nonmagnetic material is loaded to generate a high frequency eddy current in the nonmagnetic material. With the generation of such a high frequency eddy current, the nonmagnetic material can be heated by joule heat.

Whereas a magnetic material made of iron or other material has a large impedance to an eddy current. Therefore, even if a frequency lower than the frequency of the high-frequency current supplied to the first heating coil 11a and the third heating coil 11c, for example, a frequency of 20 kHz or more and 40 kHz or less, is supplied to the second heating coil 11b having the upper part on which a magnetic material is loaded, the heating target 5 can be sufficiently heated by joule heat caused by an eddy current.

As described above, in the heating action of inductively heating the heating target 5 made of a composite, the control unit 45 controls energization of each heating coil corresponding to the material forming the heating target 5 loaded on the upper part of the heating coil. Therefore, it is possible to perform induction heating suitable for a material forming the heating target 5 so that nonuniformity in a heating temperature of the heating target 5 can be reduced.

In the heating action of inductively heating the heating target 5 made of a composite, if frequencies of high-frequency currents for energizing the respective heating coils are set to the same frequency or similar frequencies, the center portion (magnetic portion) and the outer peripheral portion (nonmagnetic portion) of the heating target 5 made of a composite cannot be uniformly heated. For example, when the heating coils are energized at a low frequency, the temperature of the center portion of the heating target 5 made of a composite becomes higher than that of the outer peripheral portion. Whereas, when the respective heating coils are energized at a high frequency, for example, the temperature of the outer peripheral portion of the heating target 5 made of a composite becomes higher than that of the center portion.

The description has been made, with reference to FIG. 9, for the case where the heating target 5 made of a composite is loaded on the upper parts of the first heating coil 11a to the third heating coil 11c. However, the position where the heating target 5 is loaded is not limited to the above. For example, when the heating target 5 made of a composite is loaded on the upper parts of the second heating coil 11b to the fourth heating coil 11d, the material determiner 46 determines that the material forming the heating target 5 loaded on the upper part of the second heating coil 11b and the upper part of the fourth heating coil 11d at least includes a nonmagnetic material, and the material forming the heating target 5 loaded on the upper part of the third heating coil 11c is the magnetic material 6.

In other words, in the case where, of the first heating coil 11a to the fourth heating coil 11d, the heating coil having the upper part on which the heating target 5 formed by the material that is the magnetic material 6 is loaded is positioned between two heating coils having the upper parts on which the heating target 5 formed by the material at least including a nonmagnetic material is loaded, the material determiner 46 determines that the heating target 5 made of a composite is loaded.

The control unit 45 sets, of the first heating coil 11a to the fourth heating coil 11d, the frequency of a high-frequency current supplied to the heating coils, having the upper parts on which the heating target 5 formed by the material at least including a nonmagnetic material is loaded, higher than the frequency of a high-frequency current supplied to the heating coil, having the upper part on which the heating target 5 formed by the material that is a magnetic material is loaded.

When a plurality of heating coils that are adjacent to each other are driven at the same time, interference noise may be generated, the interference noise corresponding to a difference in driving frequency between the coils. To prevent such interference noise, the control unit 45 may set the driving frequency of each of the drive circuit 50a and the drive circuit 50c to be higher than the driving frequency of the drive circuit 50b by the audible frequency or more (approximately 20 kHz or more). For example, when the driving frequency of the drive circuit 50a and the drive circuit 50c is varied within a preset range besides the above-described control based on the on-duty ratio variation, the lower limit of the driving frequency of the drive circuit 50a and the drive circuit 50c is set to be higher than the upper limit of the driving frequency of the drive circuit 50b by 20 kHz. Note that the maximum driving frequency of the drive circuit 50a and the drive circuit 50c is 100 kHz, for example.

With such setting, it is possible to prevent the generation of the interference noise that may be generated when the first heating coil 11a to the third heating coil 11c disposed adjacent to each other are driven at the same time.

(Large Diameter)

Figure 11:
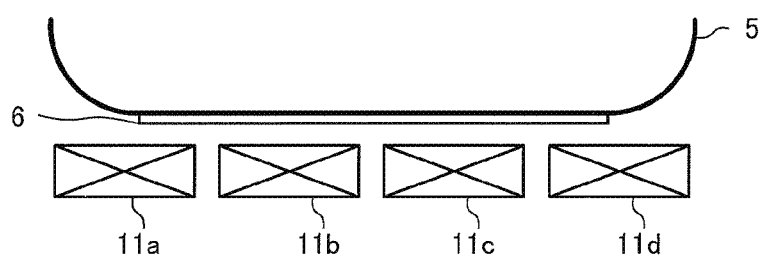
FIG. 11 is a diagram showing the heating target and the heating coils of the induction heating cooking apparatus according to Embodiment 1.

FIG. 11 is a diagram showing the heating target and the heating coils of the induction heating cooking apparatus according to Embodiment 1. FIG. 11 schematically shows the longitudinal section of a state where the heating target 5 made of a composite is loaded on the heating zone. The illustration of the top plate 4 is omitted in FIG. 11.

In the case where the heating target 5 having a large diameter size and made of a composite is loaded on the heating zone of the induction heating cooking apparatus 100 as shown in FIG. 11, the material determiner 46 determines that the magnetic material 6 is loaded on a part of the upper part of the first heating coil 11a, while a nonmagnetic material is loaded on other parts of the upper part of the first heating coil 11a. The material determiner 46 also determines that the magnetic material 6 is loaded on the upper part of the second heating coil 11b. The material determiner 46 also determines that the magnetic material 6 is loaded on the upper part of the third heating coil 11c. The material determiner 46 also determines that the magnetic material 6 is loaded on a part of the upper part of the fourth heating coil 11d, while a nonmagnetic material is loaded on other parts of the upper part of the fourth heating coil 11d.

In other words, the material determiner 46 determines that the heating target 5 is loaded on the upper parts of the first heating coil 11a to the fourth heating coil 11d, and the material forming the heating target 5 is a composite.

Figure 12:
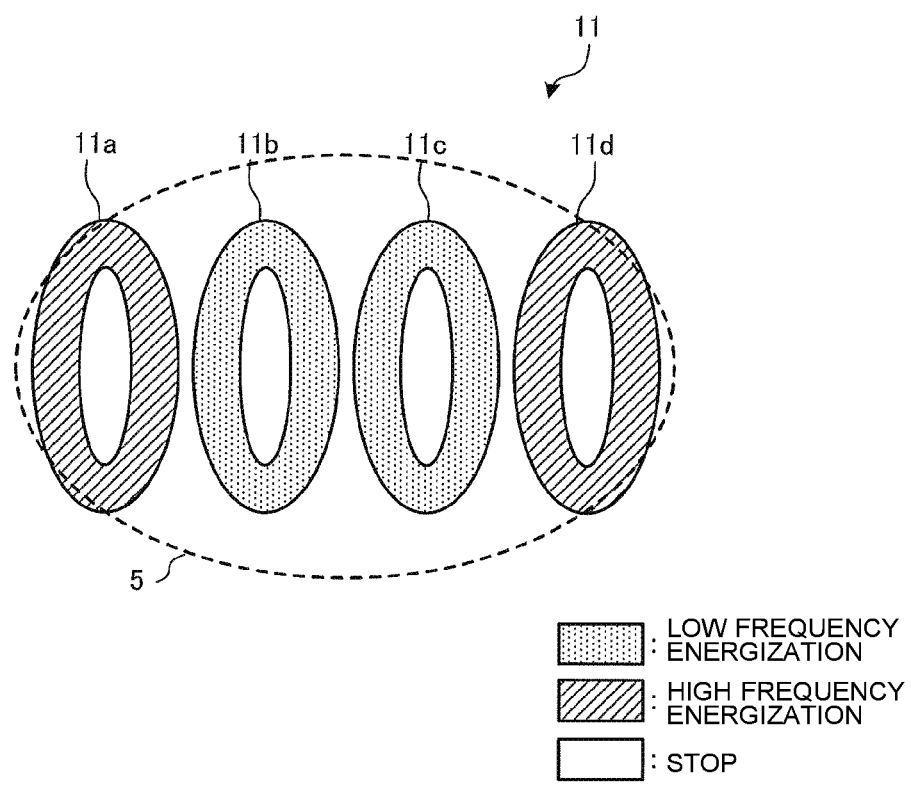
FIG. 12 is a plan view schematically showing the energization states of the heating coils of the induction heating cooking apparatus according to Embodiment 1.

FIG. 12 is a plan view schematically showing the energization states of the heating coils of the induction heating cooking apparatus according to Embodiment 1.

When the material forming the heating target 5 loaded on the upper part of the first heating coil 11a and the upper part of the fourth heating coil 11d at least includes a nonmagnetic material, and the material forming the heating target 5 loaded on the upper part of the second heating coil 11b and the upper part of the third heating coil 11c is the magnetic material 6, the control unit 45 performs the following action.

The control unit 45 causes the drive circuit 50a to the drive circuit 50d to operate. In other words, the control unit 45 supplies a high-frequency current to the first heating coil 11a to the fourth heating coil 11d having the upper parts on which the heating target 5 is loaded.

Further, the control unit 45 sets the frequency of the high-frequency current supplied from the drive circuit 50a to the first heating coil 11a and the frequency of the high-frequency current supplied from the drive circuit 50d to the fourth heating coil 11d higher than the frequency of the high-frequency current supplied from the drive circuit 50b to the second heating coil 11b and the frequency of the high-frequency current supplied from the drive circuit 50c to the third heating coil 11c.

For example, the control unit 45 sets the frequency of the high-frequency current supplied from the drive circuit 50a to the first heating coil 11a and the frequency of the high-frequency current supplied from the drive circuit 50d to the fourth heating coil 11d to a frequency corresponding to a nonmagnetic material, for example, to 90 kHz. The control unit 45 also sets the frequency of the high-frequency current supplied from the drive circuit 50b to the second heating coil 11b and the frequency of the high-frequency current supplied from the drive circuit 50c to the third heating coil 11c to a frequency corresponding to a magnetic material, for example, to 25 kHz.

The control unit 45 controls the heating power (electric power) by changing the on-duty ratio (on-off ratio) of the switching element of each inverter circuit 23. With such control, the heating target 5 placed on the top plate 4 is inductively heated.

In the same manner as the above-described action performed for the heating target 5 having the intermediate diameter size, to prevent interference noises when the plurality of heating coils disposed adjacent to each other are driven at the same time, the control unit 45 may set the driving frequency of the drive circuit 50a and the drive circuit 50d to be higher than the driving frequency of the drive circuit 50b and the drive circuit 50c by the audible frequency or more (approximately 20 kHz or more).

The heating action performed in the case where the heating target 5 made of a composite is loaded has been described above separately for the heating target 5 having an intermediate diameter size and for the heating target 5 having a large diameter size. However, the size of the heating target 5 is not limited to the above. In the case where the heating target 5 having a small diameter size is loaded on the upper parts of two heating coils out of the first heating coil 11a to the fourth heating coil 11d, the control unit 45 performs the following action.

For example, in the case where the heating target 5 having a small diameter size and made of a composite is loaded on the upper part of the first heating coil 11a and the upper part of the second heating coil 11b, and the material determiner 46 determines that the material forming the heating target 5 loaded on the upper part of the first heating coil 11a at least includes a nonmagnetic material, and the material forming the heating target 5 loaded on the upper part of the second heating coil 11b is the magnetic material 6, the control unit 45 performs the following action. The control unit 45 causes the drive circuit 50a and the drive circuit 50b to operate. Further, the control unit 45 sets the frequency of a high-frequency current supplied from the drive circuit 50a to the first heating coil 11a higher than the frequency of a high-frequency current supplied from the drive circuit 50b to the second heating coil 11b.

The control unit 45 controls the heating power (electric power) by changing the on-duty ratio (on-off ratio) of the switching element of each inverter circuit 23. With such control, the heating target 5 placed on the top plate 4 and made of a composite is inductively heated at a frequency suitable for a material forming the heating target 5.

<Heating Target 5 Made of Magnetic Material>

Next, the description will be made for the heating action performed in the case where the heating target 5 made of only a magnetic material is loaded on the first induction heating zone 1.

Figure 13:
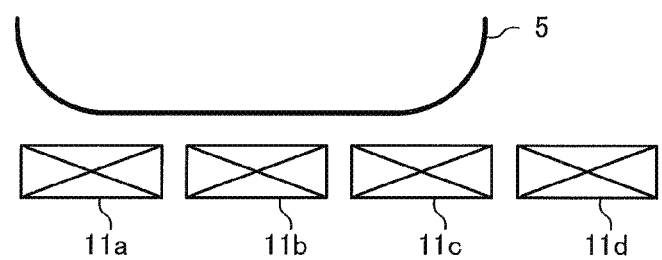
FIG. 13 is a diagram showing the heating target and the heating coils of the induction heating cooking apparatus according to Embodiment 1.

FIG. 13 is a diagram showing the heating target and the heating coils of the induction heating cooking apparatus according to Embodiment 1. FIG. 13 schematically shows the longitudinal section of a state where the heating target 5 having an intermediate diameter size and made of a magnetic material is loaded on the heating zone. The illustration of the top plate 4 is omitted in FIG. 13.

In the case where the heating target 5 made of only a magnetic material and having an intermediate diameter size is loaded on the heating zone of the induction heating cooking apparatus 100 as shown in FIG. 13, the material determiner 46 determines that a magnetic material is loaded on the upper parts of the first heating coil 11a, the second heating coil 11b, and the third heating coil 11c. The material determiner 46 also determines that no heating target 5 is loaded on the upper part of the fourth heating coil 11d.

The control unit 45 causes the drive circuit 50a, the drive circuit 50b, and the drive circuit 50c to operate, whereas the control unit 45 stops the action of the drive circuit 50d. In other words, the control unit 45 supplies a high-frequency current to the first heating coil 11a to the third heating coil 11c having the upper parts on which the heating target 5 is loaded, whereas the control unit 45 stops supply of a high-frequency current to the fourth heating coil 11d having the upper part on which no heating target 5 is loaded.

Further, the control unit 45 sets the frequency of the high-frequency current supplied from the drive circuit 50a to the first heating coil 11a, the frequency of the high-frequency current supplied from the drive circuit 50b to the second heating coil 11b, and the frequency of the high-frequency current supplied from the drive circuit 50c to the third heating coil 11c to a frequency set in advance corresponding to a magnetic material, for example, to 25 kHz.

The control unit 45 controls the heating power (electric power) by changing the on-duty ratio (on-off ratio) of the switching element of each inverter circuit 23. With such control, the heating target 5 placed on the top plate 4 is inductively heated.

The heating action performed in the case where the heating target 5 made of a magnetic material is loaded has been described above for the heating target 5 having an intermediate diameter size. However, the size of the heating target 5 is not limited to the above. In the case where the heating target 5 made of a magnetic material and having a small diameter size or a large diameter size is loaded, the control unit 45 supplies, to the heating coil having the upper part on which a magnetic material is loaded out of the first heating coil 11a to the fourth heating coil 11d, a high-frequency current at a frequency set in advance corresponding to a magnetic material. With such an operation, inductively heating suitable for the size of the heating target 5 placed on the top plate 4 and made of a magnetic material is performed.

When the material determiner 46 periodically performs the material determination process, so that the determination result is updated in the above-described heating action, the control unit 45 may perform induction heating suitable for the size and material of the heating target 5 on the basis of the updated determination result.

With such a configuration, even when the position where the heating target 5 is loaded is moved during the heating action, or when the heating target 5 is replaced with another heating target 5 made of a different material, it is possible to perform induction heating suitable for a material forming the heating target 5 loaded on the heating zone.

(Advantageous Effect)

As described above, in Embodiment 1, when at least one heating coil having the upper part on which the heating target 5 formed by the material that is a magnetic material is loaded is positioned between two heating coils having the upper parts on which the heating target 5 formed by the material at least including a nonmagnetic material is loaded, the control unit 45 performs the following action. That is, the control unit 45 sets the frequency of a high-frequency current supplied to the heating coils having the upper parts on which the heating target 5 formed by the material at least including a nonmagnetic material is loaded higher than the frequency of a high-frequency current supplied to the heating coil having the upper part on which the heating target 5 formed by the material that is a magnetic material is loaded.

Therefore, in inductively heating the heating target 5 made of a composite, it is possible to perform induction heating suitable for the material forming the heating target 5 so that nonuniformity in a heating temperature of the heating target 5 can be reduced.

Further, the heating target 5 can be heated quickly compared with the case where only the center portion or the outer peripheral portion of the heating target 5 is inductively heated, so that it is possible to acquire an induction heating cooking apparatus that allows heating and cooking within a short time, thus having great usability and high efficiency.

Further, in Embodiment 1, when the material forming the heating target 5 loaded on the upper part of the first heating coil 11*a* at least includes a nonmagnetic material, and the material forming the heating target 5 loaded on the upper part of the second heating coil 11*b* is the magnetic material 6, the control unit 45 performs the following action. That is, the control unit 45 sets the frequency of a high-frequency current supplied from the drive circuit 50*a* to the first heating coil 11*a* higher than the frequency of a high-frequency current supplied from the drive circuit 50*b* to the second heating coil 11*b*.

Therefore, in inductively heating the heating target 5 made of a composite, it is possible to perform induction heating suitable for the material forming the heating target 5 so that nonuniformity in a heating temperature of the heating target 5 can be reduced.

Further, in Embodiment 1, the first heating coil 11*a* to the fourth heating coil 11*d* have the identical shape and the identical size.

Therefore, the heating coils have the same area as viewed in a plan view. Accordingly, when the same high-frequency current is supplied to each heating coil, the same eddy current per unit area is generated in the heating target 5 disposed immediately above each heating coil. Accordingly, nonuniformity in a heating temperature of the heating target 5 can be reduced.

Further, in Embodiment 1, the first heating coil 11*a* to the fourth heating coil 11*d* are aligned in one row in such a manner that the major axes LA of the elliptical shapes are orthogonal to the straight line CL.

Therefore, the heating target 5 having an intermediate diameter size or less can be inductively heated in a state where the heating target 5 is loaded at an arbitrary position within a range of the first heating coil 11*a* to the fourth heating coil 11*d*. Accordingly, it is possible to acquire an induction heating cooking apparatus having great usability and a high degree of freedom in the position where the heating target 5 is loaded.

Further, in Embodiment 1, the first heating coil 11*a* to the fourth heating coil 11*d* are arranged in such a manner that the interval L2 between two heating coils that are adjacent to each other is smaller than a half of the length L1 of the minor axis of the heating coil.

Therefore, a reduction in a temperature of the heating target 5 at an area between two heating coils can be prevented so that nonuniformity in a heating temperature can be reduced.

Embodiment 2

In Embodiment 2, the description will be made for, in a heating action of heating the heating target 5 made of a composite, an action of switching a heating coil to which a high-frequency current is supplied out of the plurality of heating coils. Note that in the description made hereinafter, components identical to the corresponding components in Embodiment 1 described above are given the same reference symbols, and points making Embodiment 2 different from Embodiment 1 will be mainly described.

(Configuration)

Figure 14:
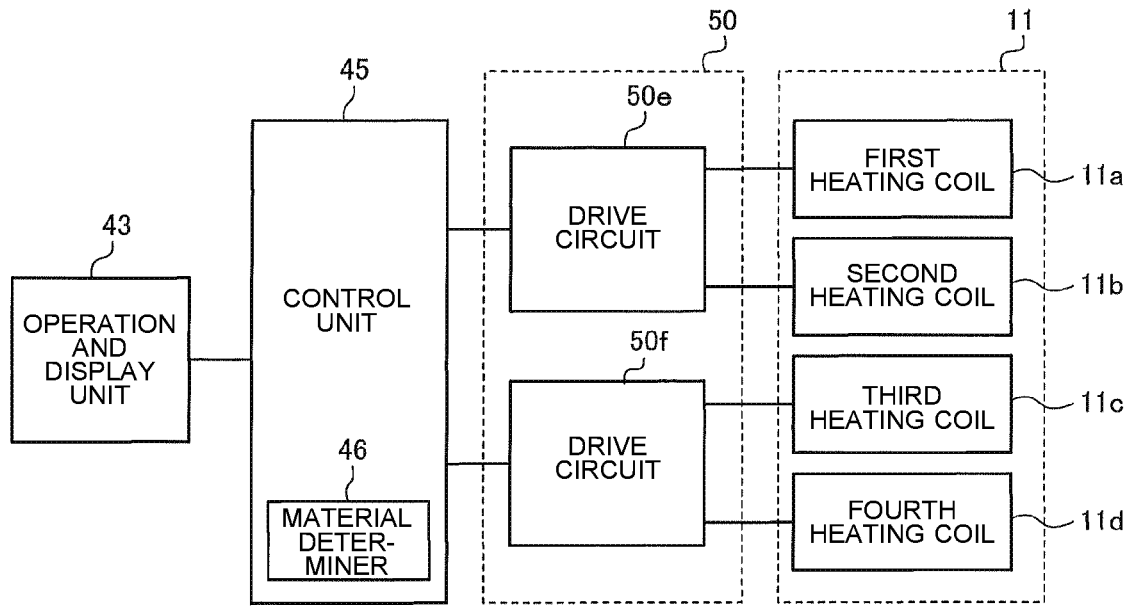
FIG. 14 is a block diagram showing a configuration of an induction heating cooking apparatus according to Embodiment 2.

FIG. 14 is a block diagram showing a configuration of an induction heating cooking apparatus according to Embodiment 2.

As shown in FIG. 14, the first induction heating unit 11 is driven and controlled by a drive circuit 50*e* and a drive circuit 50*f*. The first heating coil 11*a* and the second heating coil 11*b* are driven and controlled by the drive circuit 50*e*. The third heating coil 11*c* and the fourth heating coil 11*d* are driven and controlled by the drive circuit 50*f*. When a high-frequency current is supplied from the drive circuit 50*e* to the first heating coil 11*a*, a high-frequency magnetic field is generated from the first heating coil 11*a*. When a high-frequency current is supplied from the drive circuit 50*e* to the second heating coil 11*b*, a high-frequency magnetic field is generated from the second heating coil 11*b*. When a high-frequency current is supplied from the drive circuit 50*f* to the third heating coil 11*c*, a high-frequency magnetic field is generated from the third heating coil 11*c*. When a high-frequency current is supplied from the drive circuit 50*f* to the fourth heating coil 11*d*, a high-frequency magnetic field is generated from the fourth heating coil 11*d*.

Figure 15:
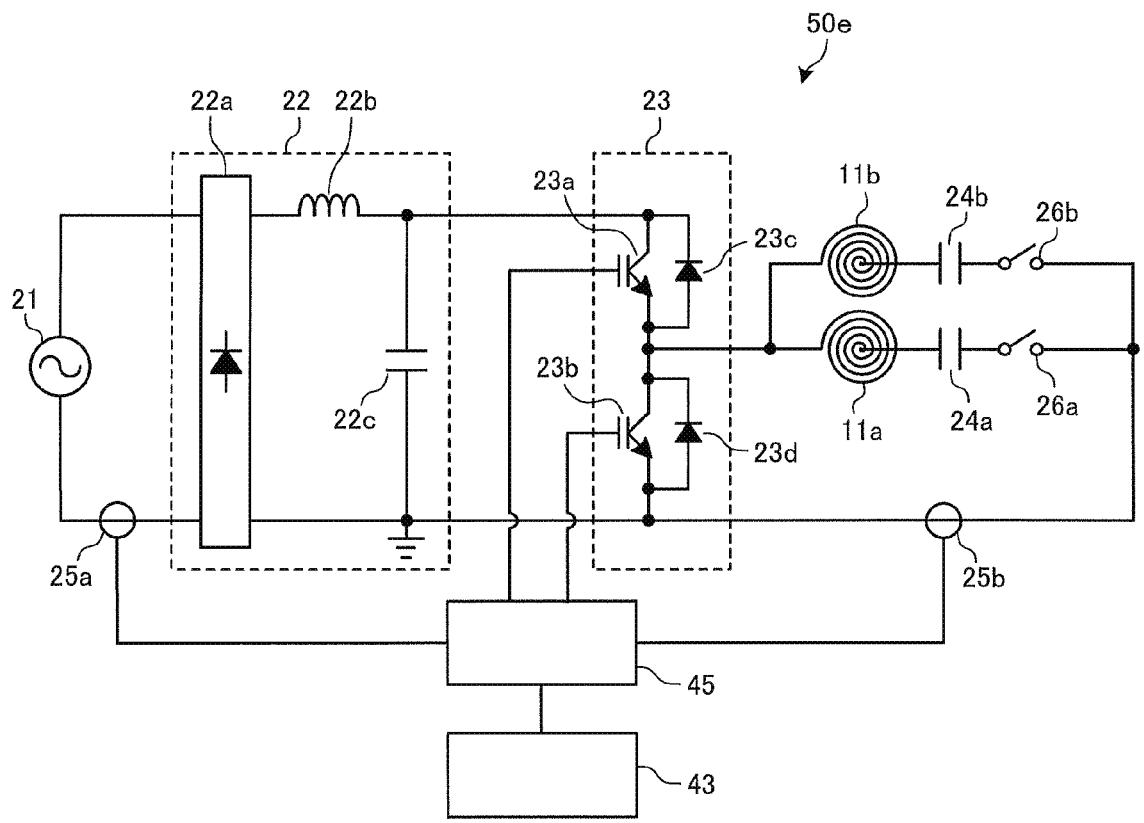
FIG. 15 is a diagram showing a drive circuit of the induction heating cooking apparatus according to Embodiment 2.

FIG. 15 is a diagram showing a drive circuit of the induction heating cooking apparatus according to Embodiment 2.

FIG. 15 shows the drive circuit 50*e* that drives the first heating coil 11*a* and the second heating coil 11*b*.

As shown in FIG. 15, the drive circuit 50*e* includes the DC power supply circuit 22, the inverter circuit 23, the resonant capacitor 24*a*, a resonant capacitor 24*b*, a switch 26*a*, and a switch 26*b*.

Configurations of the DC power supply circuit 22 and the inverter circuit 23 are the same as the corresponding configurations in Embodiment 1 described above.

The resonant capacitor 24*a* is connected in series to the first heating coil 11*a*. The resonant capacitor 24*b* is connected in series to the second heating coil 11*b*. A resonant circuit made of the first heating coil 11*a* and the resonant capacitor 24*a* and a resonant circuit made of the second heating coil 11*b* and the resonant capacitor 24*b* are connected in parallel.

The resonant circuit made of the first heating coil 11*a* and the resonant capacitor 24*a* has a resonant frequency that depends on the inductance of the first heating coil 11*a* and the capacitance of the resonant capacitor 24*a*. The inductance of the first heating coil 11*a* changes depending on a characteristic of a metal load when the heating target 5, which is the metal load, is magnetically coupled to the first heating coil 11*a*, and the resonant frequency of the resonant circuit changes depending on the change in the inductance of the first heating coil 11*a*.

The resonant circuit made of the second heating coil 11*b* and the resonant capacitor 24*b* has a resonant frequency that depends on the inductance of the second heating coil 11*b* and the capacitance of the resonant capacitor 24*b*. The inductance of the second heating coil 11*b* changes depending on a characteristic of a metal load when the heating target 5, which is the metal load, is magnetically coupled to the second heating coil 11b, and the resonant frequency of the resonant circuit changes depending on the change in the inductance of the second heating coil 11b.

The switch 26a is connected in series to the resonant circuit made of the first heating coil 11a and the resonant capacitor 24a. The switch 26a is switched between an on state and an off state by the control unit 45. When the switch 26a is in an on state, a high-frequency current from the inverter circuit 23 is supplied to the resonant circuit made of the first heating coil 11a and the resonant capacitor 24a. When the switch 26a is in an off state, the supply of a high-frequency current to the resonant circuit made of the first heating coil 11a and the resonant capacitor 24a is stopped.

The switch 26b is connected in series to the resonant circuit made of the second heating coil 11b and the resonant capacitor 24b. The switch 26b is switched between an on state and an off state by the control unit 45. When the switch 26b is in an on state, a high-frequency current from the inverter circuit 23 is supplied to the resonant circuit made of the second heating coil 11b and the resonant capacitor 24b. When the switch 26b is in an off state, the supply of a high-frequency current to the resonant circuit made of the second heating coil 11b and the resonant capacitor 24b is stopped.

When a high-frequency current is supplied to the first heating coil 11a, the heating target 5 loaded on the top plate 4 immediately above the first heating coil 11a is inductively heated by a high-frequency magnetic flux generated by the high-frequency current flowing through the first heating coil 11a. Further, when a high-frequency current is supplied to the second heating coil 11b, the heating target 5 loaded on the top plate 4 immediately above the second heating coil 11b is inductively heated by a high-frequency magnetic flux generated by the high-frequency current flowing through the second heating coil 11b.

The coil current detecting unit 25b detects the sum of the electric current flowing through the first heating coil 11a and the electric current flowing through the second heating coil 11b, and the coil current detecting unit 25b outputs a voltage signal corresponding to a value of a coil current to the control unit 45.

The drive circuit 50e that drives the first heating coil 11a and the second heating coil 11b has been described with reference to FIG. 15. However, a similar configuration is also applicable to the drive circuit 50f that drives the third heating coil 11c and the fourth heating coil 11d. In other words, the drive circuit 50f includes a resonant capacitor 24c connected in series to the third heating coil 11c in place of the resonant capacitor 24a of the drive circuit 50e. The drive circuit 50f includes a resonant capacitor 24d connected in series to the fourth heating coil 11d in place of the resonant capacitor 24b of the drive circuit 50e. The drive circuit 50f includes a switch 26c in place of the switch 26a of the drive circuit 50e. The drive circuit 50f includes a switch 26d in place of the switch 26b of the drive circuit 50e.

When the switch 26c is in an on state, a high-frequency current from the inverter circuit 23 is supplied to a resonant circuit made of the third heating coil 11c and the resonant capacitor 24c. When the switch 26c is in an off state, the supply of a high-frequency current to the resonant circuit made of the third heating coil 11c and the resonant capacitor 24c is stopped. When the switch 26d is in an on state, a high-frequency current from the inverter circuit 23 is supplied to a resonant circuit made of the fourth heating coil 11d and the resonant capacitor 24d. When the switch 26d is in an off state, the supply of a high-frequency current to the resonant circuit made of the fourth heating coil 11d and the resonant capacitor 24d is stopped.

In Embodiment 2, the description will be made for the configuration where the first heating coil 11a to the fourth heating coil 11d are driven by the drive circuit 50e and the drive circuit 50f. However, the present disclosure is not limited to such a configuration. In the same manner as in Embodiment 1 described above, the first heating coil 11a to the fourth heating coil 11d may be respectively driven by the drive circuit 50a to the drive circuit 50d that are independently provided.

(Action)

Next, an action of the induction heating cooking apparatus of Embodiment 2 will be described.

When a user loads the heating target 5 on the first induction heating zone 1, and instructs the operation and display unit 43 to start heating, the material determiner 46 of the control unit 45 performs a material determination process.

In the material determination process, the control unit 45 drives the inverter circuit 23 of each of the drive circuit 50e and the drive circuit 50f with a specific drive signal for determining a material. The control unit 45 also sequentially switches the switch 26a and the switch 26b of the drive circuit 50e and the switch 26c and the switch 26d of the drive circuit 50f to an on state to supply a high-frequency current from the inverter circuit 23 to each of the first heating coil 11a to the fourth heating coil 11d. The control unit 45 detects an input current from the signal output from the input current detecting unit 25a. At the same time, the control unit 45 also detects a coil current from the signal output from the coil current detecting unit 25b.

In the same manner as in Embodiment 1 described above, the material determiner 46 of the control unit 45 determines a material forming the heating target 5 loaded on the upper part of each of the heating coils on the basis of the detected coil current and input current and the material determining table.

Hereinafter, the heating action performed in the case where the heating target 5 made of a composite is loaded on the first induction heating zone 1 will be described separately for the case where the heating target 5 having an intermediate diameter size is loaded (see FIG. 9) and for the case where the heating target 5 having a large diameter size is loaded (see FIG. 11).

(Intermediate Diameter)

In the case where the heating target 5 having an intermediate diameter size and made of a composite is loaded on the heating zone of the induction heating cooking apparatus 100 as shown in FIG. 9, the material determiner 46 determines that the material forming the heating target 5 loaded on the upper part of the first heating coil 11a and the upper part of the third heating coil 11c at least includes a nonmagnetic material. The material determiner 46 also determines that the material forming the heating target 5 loaded on the upper part of the second heating coil 11b is a magnetic material, and that no load is placed on the upper part of the fourth heating coil 11d, that is, no heating target 5 is loaded on the upper part of the fourth heating coil 11d.

FIG. 16 is a table for describing the heating actions of the induction heating cooking apparatus according to Embodiment 2.

Figure 17:
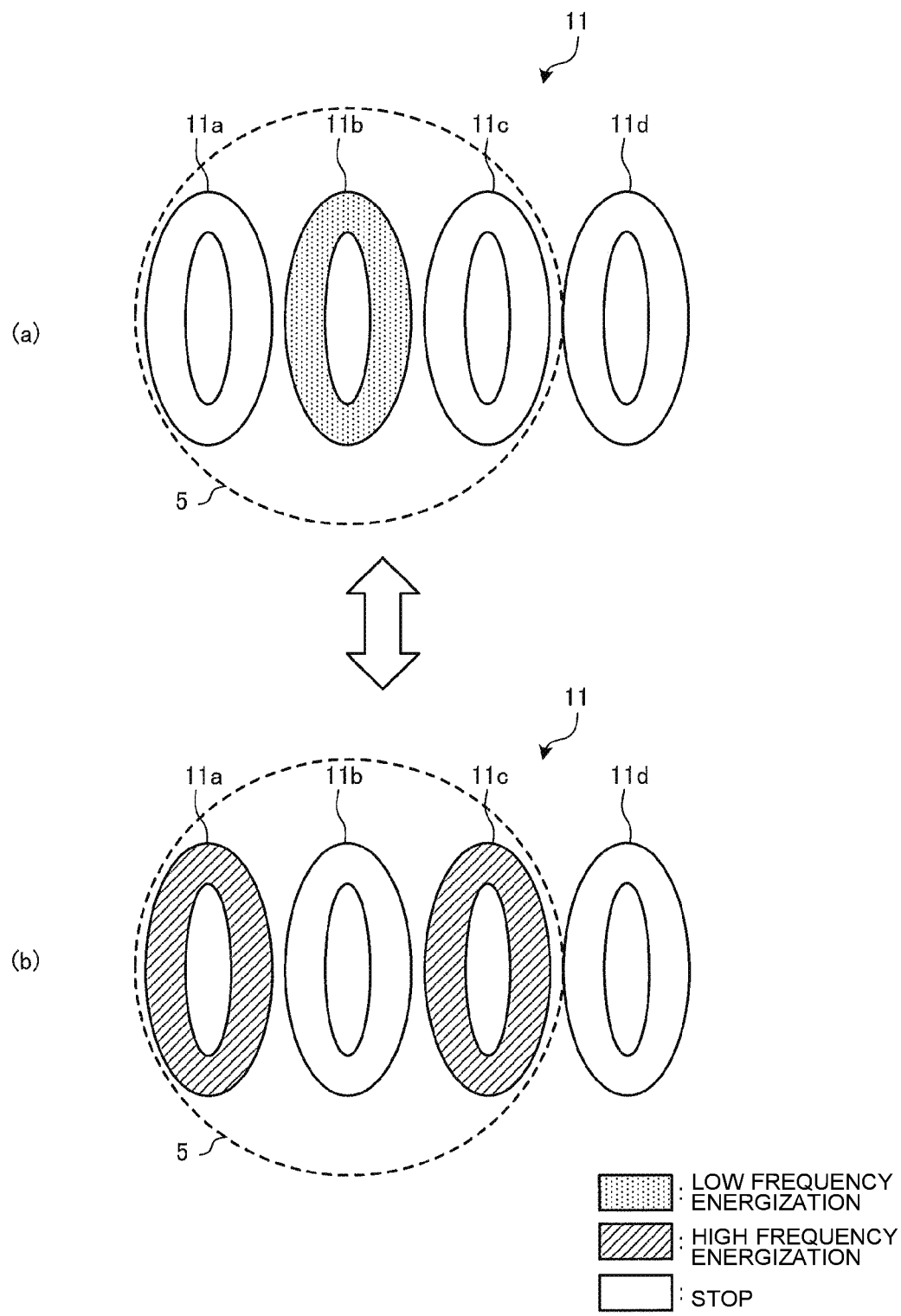
FIG. 17 includes plan views schematically showing energization states of heating coils of the induction heating cooking apparatus according to Embodiment 2.

FIG. 17 includes plan views schematically showing energization states of the heating coils of the induction heating cooking apparatus according to Embodiment 2.

FIG. 16 shows the materials forming the heating target 5 loaded on the upper parts of the respective heating coils and the energization states of the respective heating coils during a first action and a second action in the case where the heating target 5 having an intermediate diameter size and made of a composite is loaded on the heating zone of the induction heating cooking apparatus 100.

FIG. 17(a) schematically shows the energization states of the respective heating coils during the first action. FIG. 17(b) schematically shows the energization states of the respective heating coils during the second action.

When the material forming the heating target 5 loaded on the upper part of the first heating coil 11a and the upper part of the third heating coil 11c at least includes a nonmagnetic material, and the material forming the heating target 5 loaded on the upper part of the second heating coil 11b is the magnetic material 6, the control unit 45 alternately switches the action between the first action and the second action.

The first action is the action of stopping supply of a high-frequency current to the first heating coil 11a and the third heating coil 11c having the upper parts on which the heating target 5 formed by the material at least including a nonmagnetic material is loaded, and of supplying a high-frequency current to the second heating coil 11b having the upper part on which the heating target 5 formed by the material that is the magnetic material 6 is loaded.

The second action is the action of supplying a high-frequency current to the first heating coil 11a and the third heating coil 11c having the upper parts on which the heating target 5 formed by the material at least including a nonmagnetic material is loaded, and of stopping supply of a high-frequency current to the second heating coil 11b having the upper part on which the heating target 5 formed by the material that is the magnetic material 6 is loaded.

Further, the control unit 45 sets the frequency of the high-frequency current supplied to the first heating coil 11a and the third heating coil 11c in the second action higher than the frequency of the high-frequency current supplied to the second heating coil 11b in the first action.

Specifically, in the first action, the control unit 45 brings the switch 26a of the drive circuit 50e into an off state, and brings the switch 26b of the drive circuit 50e into an on state. Then, the control unit 45 drives the inverter circuit 23 of the drive circuit 50e at a low frequency that is a frequency corresponding to the magnetic material 6. The control unit 45 stops the action of the drive circuit 50f.

In other words, of three heating coils on which the heating target 5 made of a composite is loaded, a high-frequency current at a low frequency is supplied only to the second heating coil 11b disposed at the center. A low frequency is a frequency for inductively heating the magnetic material 6, such as stainless steel, and is an arbitrary frequency included in a frequency band of approximately 20 kHz or more and approximately 40 kHz or less. By energizing only the second heating coil 11b at a low frequency, it is possible to inductively heat the magnetic material 6 at the center portion of the heating target 5 made of a composite.

After the first action is performed for a predetermined time, the control unit 45 stops driving of the inverter circuit 23 of the drive circuit 50e.

Next, in the second action, the control unit 45 brings the switch 26a of the drive circuit 50e into an on state, and brings the switch 26b of the drive circuit 50e into an off state. Further, the control unit 45 brings the switch 26c of the drive circuit 50f into an on state, and brings the switch 26d of the drive circuit 50f into an off state. Then, the control unit 45 drives the inverter circuit 23 of each of the drive circuit 50e and the drive circuit 50f at a high frequency that is a frequency corresponding to a nonmagnetic material.

In other words, of three heating coils on which the heating target 5 made of a composite is loaded, a high-frequency current at a high frequency is supplied to the first heating coil 11a and the third heating coil 11c disposed outward. A high frequency is a frequency for inductively heating a nonmagnetic material, such as aluminum, and is an arbitrary frequency included in a frequency band of approximately 50 kHz or more and approximately 100 kHz or less. By energizing the first heating coil 11a and the third heating coil 11c at a high frequency, it is possible to inductively heat a nonmagnetic material at the outer peripheral portion of the heating target 5 made of a composite.

After the second action is performed for a predetermined time, the control unit 45 stops driving of the inverter circuit 23 of each of the drive circuit 50e and the drive circuit 50f, and performs the above-described first action again.

As described above, the first action and the second action are alternately switched and hence, it is possible to perform induction heating by a high-frequency current suitable for both the magnetic material 6 and the nonmagnetic material in the composite of which the heating target 5 is made.

The action time of the first action may be equal to or different from the action time of the second action. Heat capacity of a magnetic material, such as iron and stainless steel, is larger than heat capacity of a nonmagnetic material, such as aluminum and copper. Therefore, the action time of the first action may be set longer than the action time of the second action. With such setting, it is possible to sufficiently heat a magnetic material having large heat capacity, thus hardly allows heat to transfer through the magnetic material. It is also possible to reduce excessive heating of a nonmagnetic material having small heat capacity, thus easily allowing heat to transfer through the nonmagnetic material.

Further, for example, electric power supplied to the respective heating coils in the first action may be equal to or different from electric power supplied to the respective coils in the second action. For example, electric power supplied to the first heating coil 11a and the third heating coil 11c in the second action may be set smaller than electric power supplied to the second heating coil 11b in the first action. With such setting, it is possible to reduce excessive heating of a nonmagnetic material having small heat capacity, thus easily and locally allowing generation of heat.

In the description made above, the description has been made for the case where the heating target 5 made of a composite is loaded on the upper parts of the first heating coil 11a to the third heating coil 11c. However, the position where the heating target 5 is loaded is not limited to the above. In other words, in the first action, the control unit 45 stops supply of a high-frequency current to a heating coil having the upper part on which the heating target 5 formed by the material at least including a nonmagnetic material is loaded, and the control unit 45 supplies a high-frequency current at a low frequency to a heating coil having the upper part on which the heating target 5 formed by the material that is the magnetic material 6 is loaded. Further, in the second action, the control unit 45 supplies a high-frequency current at a high frequency to a heating coil having the upper part on which the heating target formed by the material at least including a nonmagnetic material is loaded, and the control unit 45 stops supply of a high-frequency current to a heating coil having the upper part on which the heating target 5 formed by the material that is a magnetic material is loaded.

(Large Diameter)

In the case where the heating target 5 having a large diameter size and made of a composite is loaded on the heating zone of the induction heating cooking apparatus 100 as shown in FIG. 11, the material determiner 46 determines that the magnetic material 6 is loaded on a part of the upper part of the first heating coil 11*a* and a part of the upper part of the fourth heating coil 11*d*, while a nonmagnetic material is loaded on other parts of the upper part of the first heating coil 11*a* and other parts of the upper part of the fourth heating coil 11*d*. The material determiner 46 also determines that the magnetic material 6 is loaded on the upper part of the second heating coil 11*b* and the upper part of the third heating coil 11*c*.

FIG. 18 is a table for describing the heating actions of the induction heating cooking apparatus according to Embodiment 2.

Figure 19:
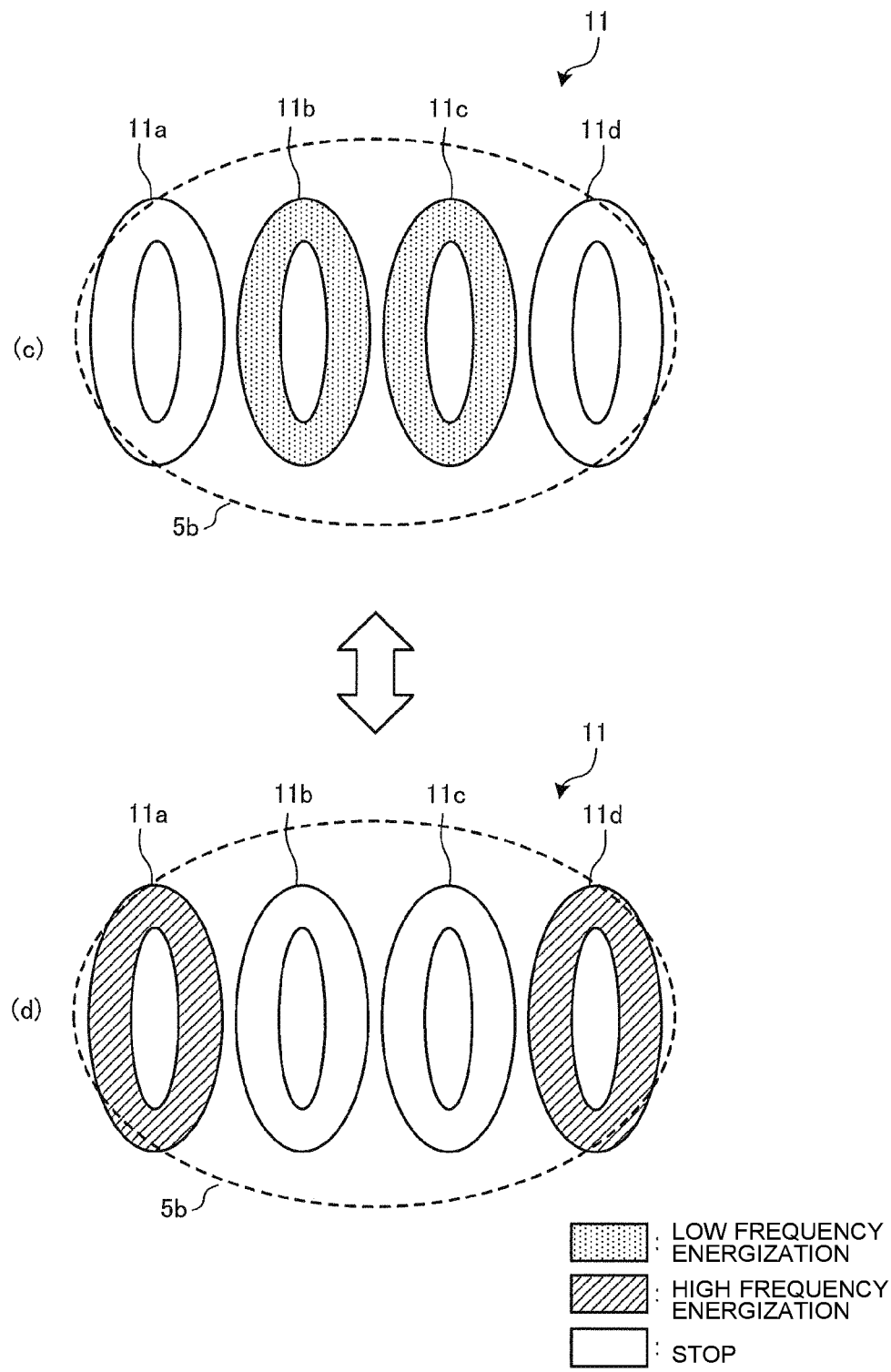
FIG. 19 includes plan views schematically showing the energization states of the heating coils of the induction heating cooking apparatus according to Embodiment 2.

FIG. 19 includes plan views schematically showing the energization states of the heating coils of the induction heating cooking apparatus according to Embodiment 2.

FIG. 18 shows the materials forming the heating target 5 loaded on the upper parts of the respective heating coils and the energization states of the respective heating coils during the first action and the second action in the case where the heating target 5 having a large diameter size and made of a composite is loaded on the heating zone of the induction heating cooking apparatus 100.

FIG. 19(*c*) schematically shows the energization states of the respective heating coils during the first action. FIG. 19(*d*) schematically shows the energization states of the respective heating coils during the second action.

When the material forming the heating target 5 loaded on the upper part of the first heating coil 11*a* and the upper part of the fourth heating coil 11*d* at least includes a nonmagnetic material, and the material forming the heating target 5 loaded on the upper part of the second heating coil 11*b* and the upper part of the third heating coil 11*c* is the magnetic material 6, the control unit 45 alternately switches the action between the first action and the second action.

The first action is the action of stopping supply of a high-frequency current to the first heating coil 11*a* and the fourth heating coil 11*d* having the upper parts on which the heating target 5 formed by the material at least including a nonmagnetic material is loaded, and of supplying a high-frequency current to the second heating coil 11*b* and the third heating coil 11*c* having the upper parts on which the heating target 5 formed by the material that is the magnetic material 6 is loaded.

The second action is the action of supplying a high-frequency current to the first heating coil 11*a* and the fourth heating coil 11*d* having the upper parts on which the heating target 5 formed by the material at least including a nonmagnetic material is loaded, and of stopping supply of a high-frequency current to the second heating coil 11*b* and the third heating coil 11*c* having the upper parts on which the heating target 5 formed by the material that is the magnetic material 6 is loaded.

Further, the control unit 45 sets the frequency of the high-frequency current supplied to the first heating coil 11*a* and the fourth heating coil 11*d* in the second action higher than the frequency of the high-frequency current supplied to the second heating coil 11*b* and the third heating coil 11*c* in the first action.

Specifically, in the first action, the control unit 45 brings the switch 26*a* of the drive circuit 50*e* into an off state, and brings the switch 26*b* of the drive circuit 50*e* into an on state. Further, the control unit 45 brings the switch 26*c* of the drive circuit 50*f* into an on state, and brings the switch 26*d* of the drive circuit 50*f* into an off state. Then, the control unit 45 drives the inverter circuit 23 of each of the drive circuit 50*e* and the drive circuit 50*f* at a low frequency that is a frequency corresponding to the magnetic material 6.

In other words, of four heating coils on which the heating target 5 made of a composite is loaded, a high-frequency current at a low frequency is supplied to the second heating coil 11*b* and the third heating coil 11*c* disposed at an intermediate portion. With such an operation, it is possible to inductively heat the magnetic material 6 at the intermediate portion of the heating target 5 made of a composite.

After the first action is performed for a predetermined time, the control unit 45 stops driving of the inverter circuit 23 of each of the drive circuit 50*e* and the drive circuit 50*f*.

Next, in the second action, the control unit 45 brings the switch 26*a* of the drive circuit 50*e* into an on state, and brings the switch 26*b* of the drive circuit 50*e* into an off state. Further, the control unit 45 brings the switch 26*c* of the drive circuit 50*f* into an off state, and brings the switch 26*d* of the drive circuit 50*f* into an on state. Then, the control unit 45 drives the inverter circuit 23 of each of the drive circuit 50*e* and the drive circuit 50*f* at a high frequency that is a frequency corresponding to a nonmagnetic material.

In other words, of four heating coils on which the heating target 5 made of a composite is loaded, a high-frequency current at a high frequency is supplied to the first heating coil 11*a* and the fourth heating coil 11*d* disposed outward. Therefore, it is possible to inductively heat a nonmagnetic material at the outer peripheral portion of the heating target 5 made of a composite.

After the second action is performed for a predetermined time, the control unit 45 stops driving of the inverter circuit 23 of each of the drive circuit 50*e* and the drive circuit 50*f*, and performs the above-described first action again.

As described above, the first action and the second action are alternately switched and hence, it is possible to perform induction heating by a high-frequency current suitable for both the magnetic material 6 and the nonmagnetic material in the composite of which the heating target 5 is made.

The heating action performed in the case where the heating target 5 made of a composite is loaded has been described above separately for the heating target 5 having an intermediate diameter size and for the heating target 5 having a large diameter size. However, the size of the heating target 5 is not limited to the above. In the case where the heating target 5 having a small diameter size is loaded on the upper parts of two heating coils out of the first heating coil 11*a* to the fourth heating coil 11*d*, the control unit 45 performs the following action.

For example, in the case where the heating target 5 having a small diameter size and made of a composite is loaded on the upper part of the first heating coil 11*a* and the upper part of the second heating coil 11*b*, and the material determiner 46 determines that the material forming the heating target 5 loaded on the upper part of the first heating coil 11*a* at least includes a nonmagnetic material, and that the material forming the heating target 5 loaded on the upper part of the second heating coil 11*b* is the magnetic material 6, the control unit 45 alternately switches the action between the first action and the second action.

Specifically, in the first action, the control unit 45 brings the switch 26*a* of the drive circuit 50*e* into an off state, brings the switch 26*b* of the drive circuit 50*e* into an on state, and drives the inverter circuit 23 of the drive circuit 50*e* at a low frequency. After the first action is performed for a predetermined time, in the second action, the control unit 45 brings the switch 26a of the drive circuit 50e into an on state, brings the switch 26b of the drive circuit 50e into an off state, and drives the inverter circuit 23 of the drive circuit 50e at a high frequency. Note that in the first action and the second action, the control unit 45 stops the action of the drive circuit 50f.

As described above, regardless of the size of the heating target 5, it is possible to perform induction heating by a high-frequency current suitable for both the magnetic material 6 and the nonmagnetic material in the composite of which the heating target 5 is made. Further, the control unit 45 controls energization of each heating coil corresponding to the size of the heating target 5, so that it is possible to acquire an induction heating cooking apparatus that allows, irrespective of the size of the heating target 5 made of a composite, heating and cooking within a short time, thus having great usability.

(Advantageous Effect)

As described above, in Embodiment 2, the control unit 45 alternately switches the action between the first action and the second action. In the first action, the control unit 45 stops supply of a high-frequency current to the heating coil having the upper part on which the heating target 5 formed by the material at least including a nonmagnetic material is loaded, and the control unit 45 supplies a high-frequency current to the heating coil having the upper part on which the heating target 5 formed by the material that is the magnetic material 6 is loaded. In the second action, the control unit 45 supplies a high-frequency current to the heating coil having the upper part on which the heating target formed by the material at least including a nonmagnetic material is loaded, and the control unit 45 stops supply of a high-frequency current to the heating coil having the upper part on which the heating target formed by the material that is a magnetic material is loaded.

Therefore, in inductively heating the heating target 5 made of a composite, it is possible to perform induction heating suitable for the material forming the heating target 5 so that nonuniformity in a heating temperature of the heating target 5 can be reduced.

Further, in Embodiment 2, the first action and the second action are alternately switched and hence, it is possible to prevent the generation of interference noise that may be generated when the heating coils disposed adjacent to each other are driven at the same time. For example, when two heating coils that are adjacent to each other are energized respectively by an electric current of 25 kHz and an electric current of 40 kHz at the same time, interference noise of 15 kHz, which is a difference between 25 kHz and 40 kHz, is generated. Whereas in Embodiment 2, the first action where low frequency energization is performed and the second action where high frequency energization is performed are alternately switched and hence, interference noise can be reduced.

In addition to the above, different from Embodiment 1 described above, it is unnecessary to set a difference between frequencies of high-frequency currents supplied to two heating coils to the audible frequency or more (approximately 20 kHz or more) for preventing interference noise. Therefore, in each of the first action and the second action, it is possible to arbitrarily vary a frequency of a high-frequency current supplied to each of the heating coils. Accordingly, it is possible to perform induction heating further suitable for a material forming the heating target 5 while interference noise is reduced.

Further, in Embodiment 2, the first action and the second action are alternately switched and hence, it is possible to reduce magnetic interference where the flow of a high-frequency current flowing through other heating coils is prevented by the effect of magnetic fluxes at a high frequency generated from the respective heating coils disposed adjacent to each other.

For example, a magnetic flux generated from one of two heating coils that are adjacent to each other is interlinked with the magnetic path of the other of the two heating coils, so that it is difficult for a high-frequency current to flow through the other heating coil. Whereas in Embodiment 2, in the first action and the second action, a heating coil to be energized is switched among the plurality of heating coils and hence, it is possible to reduce the effect of magnetic interference.

For example, when the effect of magnetic interference is large, to close magnetic paths generated from the respective heating coils, it is necessary to increase a usage amount (volume) of ferrite provided to the lower surface of each heating coil. Whereas, in Embodiment 2, the effect of magnetic interference can be reduced and hence, it is possible to reduce the usage amount (volume) of ferrite provided to the lower surface of each heating coil.

Embodiment 3

In Embodiment 3, the description will be made for, in a heating action of heating the heating target 5 made of a composite, an action of switching the frequency of a high-frequency current supplied to a plurality of heating coils. In the description made hereinafter, components identical to the corresponding components in Embodiments 1 and 2 described above are given the same reference symbols, and points making Embodiment 3 different from Embodiments 1 and 2 will be mainly described. The configuration of the induction heating cooking apparatus 100 of Embodiment 3 is the same as that in Embodiment 2 described above.

(Action)

Hereinafter, the heating action performed in the case where the heating target 5 made of a composite is loaded on the first induction heating zone 1 will be described separately for the case where the heating target 5 having an intermediate diameter size is loaded (see FIG. 9) and for the case where the heating target 5 having a large diameter size is loaded (see FIG. 11).

(Intermediate Diameter)

In the case where the heating target 5 having an intermediate diameter size and made of a composite is loaded on the heating zone of the induction heating cooking apparatus 100 as shown in FIG. 9, the material determiner 46 determines that the material forming the heating target 5 loaded on the upper part of the first heating coil 11a and the upper part of the third heating coil 11c at least includes a nonmagnetic material. The material determiner 46 also determines that the material forming the heating target 5 loaded on the upper part of the second heating coil 11b is a magnetic material, and that no load is placed on the upper part of the fourth heating coil 11d, that is, no heating target 5 is loaded on the upper part of the fourth heating coil 11d.

FIG. 20 is a table for describing the heating actions of the induction heating cooking apparatus according to Embodiment 3.

Figure 21:
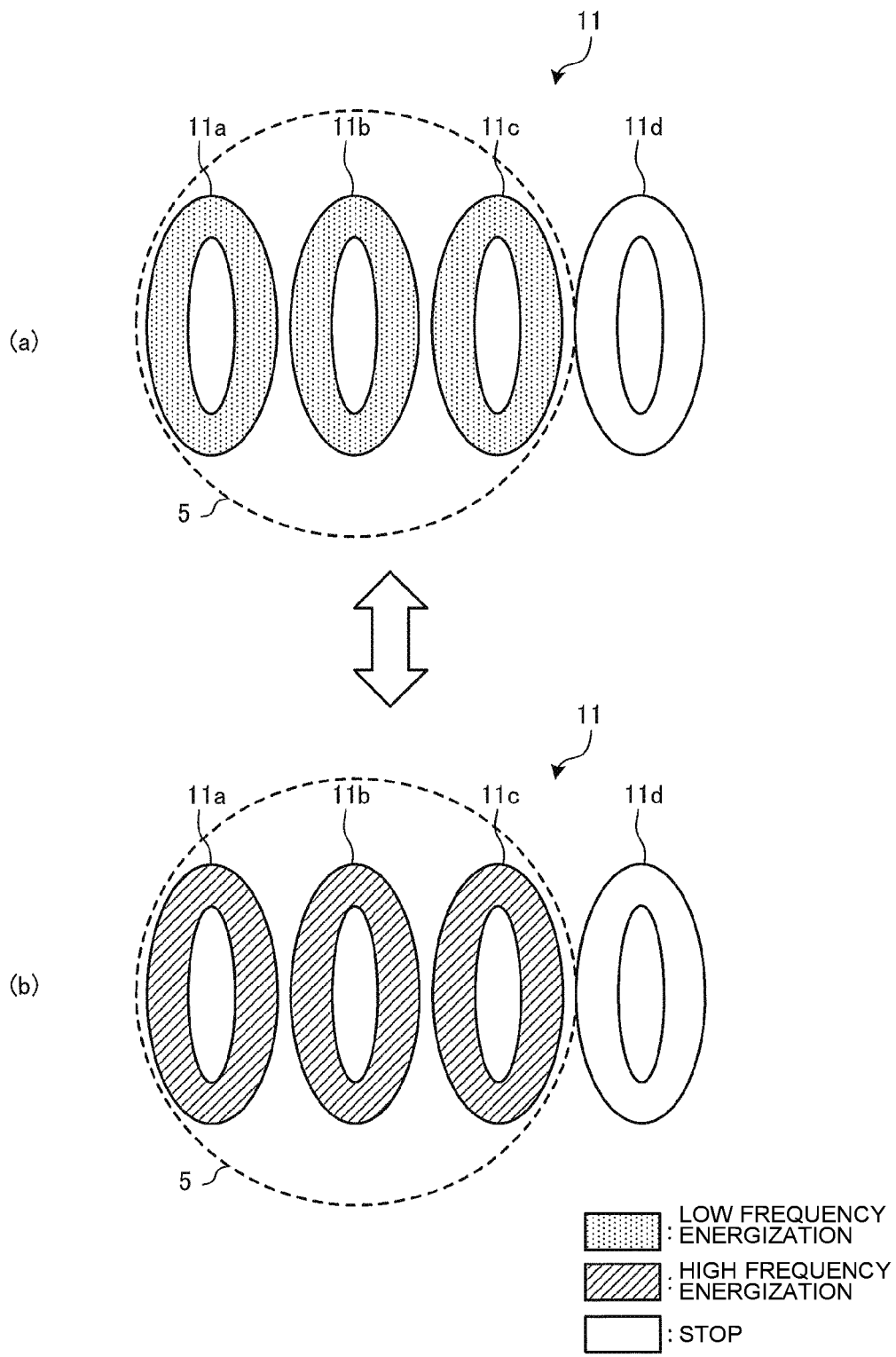
FIG. 21 includes plan views schematically showing energization states of heating coils of the induction heating cooking apparatus according to Embodiment 3.

FIG. 21 includes plan views schematically showing energization states of the heating coils of the induction heating cooking apparatus according to Embodiment 3.

FIG. 20 shows the materials forming the heating target 5 loaded on the upper parts of the respective heating coils and the energization states of the respective heating coils during a third action and a fourth action in the case where the heating target 5 having an intermediate diameter size and made of a composite is loaded on the heating zone of the induction heating cooking apparatus 100.

FIG. 21(a) schematically shows the energization states of the respective heating coils during the third action. FIG. 21(b) schematically shows the energization states of the respective heating coils during the fourth action.

When the material forming the heating target 5 loaded on the upper part of the first heating coil 11a and the upper part of the third heating coil 11c at least includes a nonmagnetic material, and the material forming the heating target 5 loaded on the upper part of the second heating coil 11b is the magnetic material 6, the control unit 45 alternately switches the action between the third action and the fourth action.

The third action is the action of supplying a high-frequency current at a frequency corresponding to a magnetic material to the first heating coil 11a and the third heating coil 11c having the upper parts on which the heating target 5 formed by the material at least including a nonmagnetic material is loaded and to the second heating coil 11b having the upper part on which the heating target 5 formed by the material that is the magnetic material 6 is loaded. In other words, the third action is the action of supplying a high-frequency current at a low frequency corresponding to a magnetic material to each of the heating coils regardless of the material forming the heating target 5 loaded on the upper parts of the heating coils.

The fourth action is the action of supplying a high-frequency current at a frequency corresponding to a nonmagnetic material to the first heating coil 11a and the third heating coil 11c having the upper parts on which the heating target 5 formed by the material at least including a nonmagnetic material is loaded and to the second heating coil 11b having the upper part on which the heating target 5 formed by the material that is the magnetic material 6 is loaded. In other words, the fourth action is the action of supplying a high-frequency current at a high frequency corresponding to a nonmagnetic material to each of the heating coils regardless of the material forming the heating target 5 loaded on the upper parts of the heating coils.

Specifically, the control unit 45 brings the switch 26a and the switch 26b of the drive circuit 50e and the switch 26c of the drive circuit 50f into an on state, and brings the switch 26d of the drive circuit 50f into an off state.

In the third action, the control unit 45 drives the inverter circuit 23 of each of the drive circuit 50e and the drive circuit 50f at a low frequency that is a frequency corresponding to the magnetic material 6. In other words, a high-frequency current at a low frequency is supplied to the first heating coil 11a to the third heating coil 11c on which the heating target 5 made of a composite is loaded.

After the third action is performed for a predetermined time, in the fourth action, the control unit 45 drives the inverter circuit 23 of each of the drive circuit 50e and the drive circuit 50f at a high frequency that is a frequency corresponding to a nonmagnetic material. In other words, a high-frequency current at a high frequency is supplied to the first heating coil 11a to the third heating coil 11c on which the heating target 5 made of a composite is loaded.

After the fourth action is performed for a predetermined time, the control unit 45 performs the above-described third action again.

In other words, after a lapse of time for the third action and the fourth action, the frequency of the high-frequency current supplied to the heating coil having the upper part on which the heating target 5 formed by the material that is a nonmagnetic material is loaded out of the plurality of heating coils is higher than the frequency of the high-frequency current supplied to the heating coil having the upper part on which the heating target 5 formed by the material that is the magnetic material 6 is loaded out of the plurality of heating coils.

As described above, the magnetic material 6 of the heating target 5 made of a composite is inductively heated by a high-frequency current at a low frequency in the third action, and the nonmagnetic material of the heating target 5 made of a composite is inductively heated by a high-frequency current at a high frequency in the fourth action. The third action and the fourth action are alternately switched and hence, it is possible to perform induction heating by a high-frequency current suitable for both the magnetic material 6 and the nonmagnetic material in the composite of which the heating target 5 is made.

(Large Diameter)

In the case where the heating target 5 having a large diameter size and made of a composite is loaded on the heating zone of the induction heating cooking apparatus 100 as shown in FIG. 11, the material determiner 46 determines that the magnetic material 6 is loaded on a part of the upper part of the first heating coil 11a and a part of the upper part of the fourth heating coil 11d, while a nonmagnetic material is loaded on other parts of the upper part of the first heating coil 11a and other parts of the upper part of the fourth heating coil 11d. The material determiner 46 also determines that the magnetic material 6 is loaded on the upper part of the second heating coil 11b and the upper part of the third heating coil 11c.

FIG. 22 is a table for describing the heating actions of the induction heating cooking apparatus according to Embodiment 3.

Figure 23:
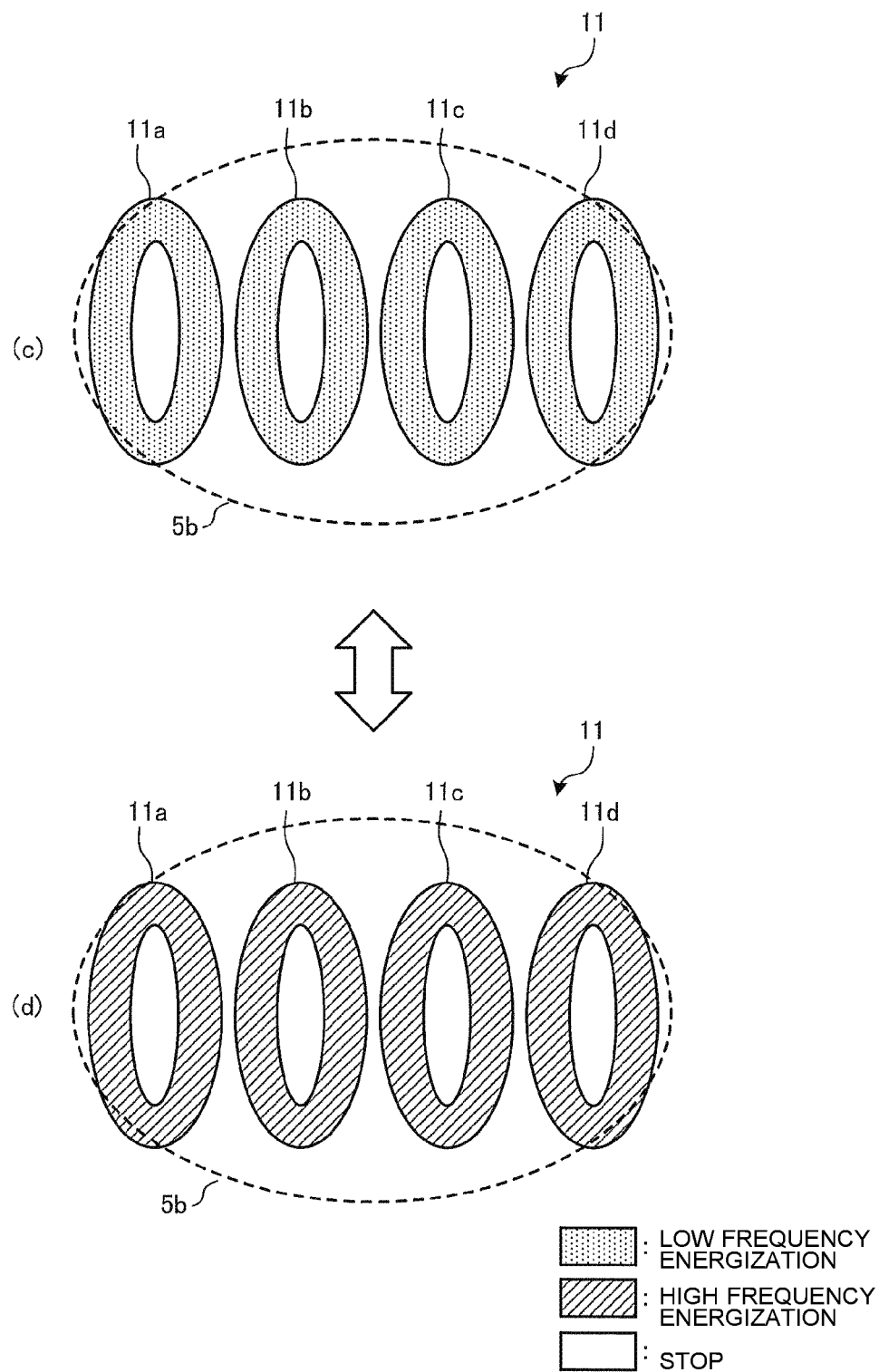
FIG. 23 includes plan views schematically showing the energization states of the heating coils of the induction heating cooking apparatus according to Embodiment 3.

FIG. 23 includes plan views schematically showing the energization states of the heating coils of the induction heating cooking apparatus according to Embodiment 3.

FIG. 22 shows the materials forming the heating target 5 loaded on the upper parts of the respective heating coils and the energization states of the respective heating coils during the third action and the fourth action in the case where the heating target 5 having a large diameter size and made of a composite is loaded on the heating zone of the induction heating cooking apparatus 100.

FIG. 23(c) schematically shows the energization states of the respective heating coils during the third action. FIG. 23(d) schematically shows the energization states of the respective heating coils during the fourth action.

When the material forming the heating target 5 loaded on the upper part of the first heating coil 11a and the upper part of the fourth heating coil 11d at least includes a nonmagnetic material, and the material forming the heating target 5 loaded on the upper part of the second heating coil 11b and the upper part of the third heating coil 11c is the magnetic material 6, the control unit 45 alternately switches the action between the third action and the fourth action.

The third action is the action of supplying a high-frequency current at a frequency corresponding to a magnetic material to the first heating coil 11a and the fourth heating coil 11d having the upper parts on which the heating target 5 formed by the material at least including a nonmagnetic material is loaded and to the second heating coil 11b and the third heating coil 11c having the upper parts on which the heating target 5 formed by the material that is the magnetic material 6 is loaded. In other words, the third action is the action of supplying a high-frequency current at a low frequency corresponding to a magnetic material to each of the heating coils regardless of the material forming the heating target 5 loaded on the upper parts of the heating coils.

The fourth action is the action of supplying a high-frequency current at a frequency corresponding to a nonmagnetic material to the first heating coil 11*a* and the fourth heating coil 11*d* having the upper parts on which the heating target 5 formed by the material at least including a nonmagnetic material is loaded and to the second heating coil 11*b* and the third heating coil 11*c* having the upper parts on which the heating target 5 formed by the material that is the magnetic material 6 is loaded. In other words, the fourth action is the action of supplying a high-frequency current at a high frequency corresponding to a nonmagnetic material to each of the heating coils regardless of the material forming the heating target 5 loaded on the upper parts of the heating coils.

Specifically, the control unit 45 brings the switch 26*a* and the switch 26*b* of the drive circuit 50*e* and the switch 26*c* and the switch 26*d* of the drive circuit 50*f* into an on state.

In the third action, the control unit 45 drives the inverter circuit 23 of each of the drive circuit 50*e* and the drive circuit 50*f* at a low frequency that is a frequency corresponding to the magnetic material 6. In other words, a high-frequency current at a low frequency is supplied to the first heating coil 11*a* to the fourth heating coil 11*d* on which the heating target 5 made of a composite is loaded.

After the third action is performed for a predetermined time, in the fourth action, the control unit 45 drives the inverter circuit 23 of each of the drive circuit 50*e* and the drive circuit 50*f* at a high frequency that is a frequency corresponding to a nonmagnetic material. In other words, a high-frequency current at a high frequency is supplied to the first heating coil 11*a* to the fourth heating coil 11*d* on which the heating target 5 made of a composite is loaded.

After the fourth action is performed for a predetermined time, the above-described third action is performed again.

As described above, the magnetic material 6 of the heating target 5 made of a composite is inductively heated by a high-frequency current at a low frequency in the third action, and the nonmagnetic material of the heating target 5 made of a composite is inductively heated by a high-frequency current at a high frequency in the fourth action. The third action and the fourth action are alternately switched and hence, it is possible to perform induction heating by a high-frequency current suitable for both the magnetic material 6 and the nonmagnetic material in the composite of which the heating target 5 is made.

The heating action performed in the case where the heating target 5 made of a composite is loaded has been described above separately for the heating target 5 having an intermediate diameter size and for the heating target 5 having a large diameter size. However, the size of the heating target 5 is not limited to the above. In the case where the heating target 5 having a small diameter size is loaded on the upper parts of two heating coils out of the first heating coil 11*a* to the fourth heating coil 11*d*, the control unit 45 performs the following action.

For example, in the case where the heating target 5 having a small diameter size and made of a composite is loaded on the upper part of the first heating coil 11*a* and the upper part of the second heating coil 11*b*, and the material determiner 46 determines that the material forming the heating target 5 loaded on the upper part of the first heating coil 11*a* at least includes a nonmagnetic material, and that the material forming the heating target 5 loaded on the upper part of the second heating coil 11*b* is the magnetic material 6, the control unit 45 alternately switches the action between the third action and the fourth action.

Specifically, the control unit 45 brings the switch 26*a* and the switch 26*b* of the drive circuit 50*e* into an on state. In the third action, the control unit 45 drives the inverter circuit 23 of the drive circuit 50*e* at a low frequency. After the third action is performed for a predetermined time, in the fourth action, the control unit 45 drives the inverter circuit 23 of the drive circuit 50*e* at a high frequency. In the third action and the fourth action, the control unit 45 stops the action of the drive circuit 50*f*.

As described above, regardless of the size of the heating target 5, it is possible to perform induction heating by a high-frequency current suitable for both the magnetic material 6 and the nonmagnetic material in the composite of which the heating target 5 is made. Further, the control unit 45 controls energization of each heating coil corresponding to the size of the heating target 5, so that it is possible to acquire an induction heating cooking apparatus that allows, irrespective of the size of the heating target 5 made of a composite, heating and cooking within a short time, thus having great usability.

The action time of the third action may be equal to or different from the action time of the fourth action. Further, for example, electric power supplied to the respective heating coils in the third action may be equal to or different from electric power supplied to the respective coils in the fourth action.

(Advantageous Effect)

As described above, in Embodiment 3, the control unit 45 alternately switches the action between the third action and the fourth action. In the third action, the control unit 45 supplies a high-frequency current at a frequency corresponding to the magnetic material 6 to the heating coil having the upper part on which the heating target 5 formed by the material at least including a nonmagnetic material is loaded, and to the heating coil having the upper part on which the heating target 5 formed by the material that is the magnetic material 6 is loaded. In the fourth action, the control unit 45 supplies a high-frequency current at a frequency corresponding to a nonmagnetic material or to a material including a magnetic material and a nonmagnetic material to the heating coil having the upper part on which the heating target 5 formed by the material at least including a nonmagnetic material is loaded, and to the heating coil having the upper part on which the heating target 5 formed by the material that is a magnetic material is loaded. In other words, the third action and the fourth action are alternately performed, the magnetic material 6 of the heating target 5 made of a composite is heated by a high-frequency current at a low frequency suitable for the magnetic material 6 in the third action, and a nonmagnetic material of the heating target 5 made of a composite is heated by a high-frequency current at a high frequency suitable for a nonmagnetic material in the fourth action.

Therefore, in inductively heating the heating target 5 made of a composite, it is possible to perform induction heating suitable for the material forming the heating target 5 so that nonuniformity in a heating temperature of the heating target 5 can be reduced.

Further, also in Embodiment 3, in the same manner as in Embodiment 2 described above, it is possible to prevent the generation of interference noise that may be generated when the heating coils disposed adjacent to each other are driven at the same time. Further, it is possible to reduce magnetic interference where the flow of a high-frequency current flowing through other heating coils is prevented by the effect of magnetic fluxes of a high frequency generated from the respective heating coils disposed adjacent to each other.

(Modification)

Another configuration example of the drive circuit 50 will be described. In this modification, a drive circuit 50g configured to drive the first heating coil 11a and the second heating coil 11b will be described.

Figure 24:
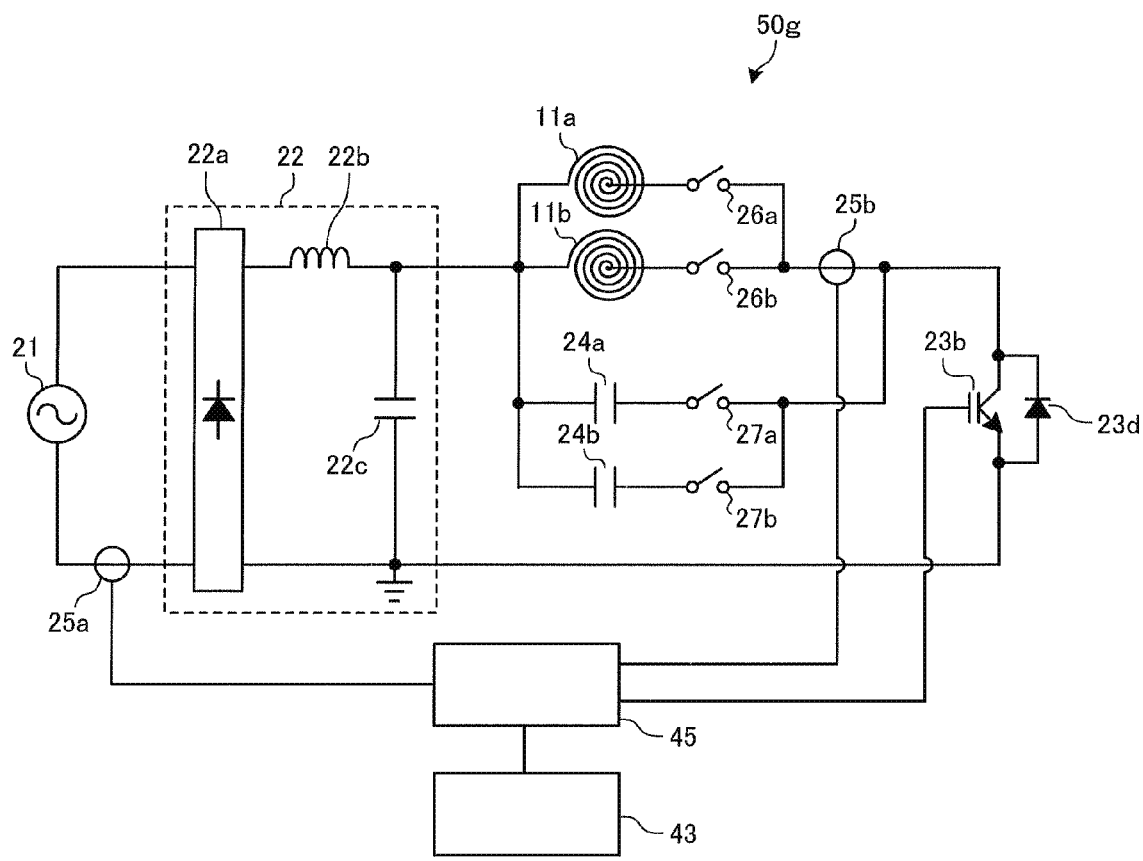
FIG. 24 is a diagram showing another drive circuit of the induction heating cooking apparatus according to Embodiment 3.

FIG. 24 is a diagram showing another drive circuit of the induction heating cooking apparatus according to Embodiment 3.

The drive circuit 50g shown in FIG. 24 is a single-transistor voltage resonant inverter, which has one switching element. In the drive circuit 50g, the first heating coil 11a, the second heating coil 11b, the resonant capacitor 24a, and the resonant capacitor 24b are connected in parallel, and each of the first heating coil 11a, the second heating coil 11b, the resonant capacitor 24a, and the resonant capacitor 24b forms a resonant circuit. Each of these resonant circuits and the IGBT 23b used as a switching element are connected in series to an output of the DC power supply circuit 22. The diode 23d used as a flywheel diode is connected in parallel to the IGBT 23b.

Further, a switch 27a is connected in series to the resonant capacitor 24a. A switch 27b is connected in series to the resonant capacitor 24b. In energizing the first heating coil 11a, the control unit 45 exercises control to bring the switch 26a and the switch 27a into an on state to form the resonant circuits arranged in parallel. In energizing the second heating coil 11b, the control unit 45 exercises control to bring the switch 26b and the switch 27b into an on state to form the resonant circuits arranged in parallel.

The control unit 45 outputs a drive signal that drives the IGBT 23b and, in the same manner as the above-described action, the control unit 45 supplies a high-frequency current to at least one of the first heating coil 11a and the second heating coil 11b. Also with such a configuration, substantially the same advantageous effect can be obtained.

FIG. 24 shows the example of the drive circuit 50g that drives the first heating coil 11a and the second heating coil 11b. However, the configuration is not limited to the above. This modification is also applicable to other drive circuits in Embodiments 1 to 3 described above.

Embodiment 4

Figure 25:
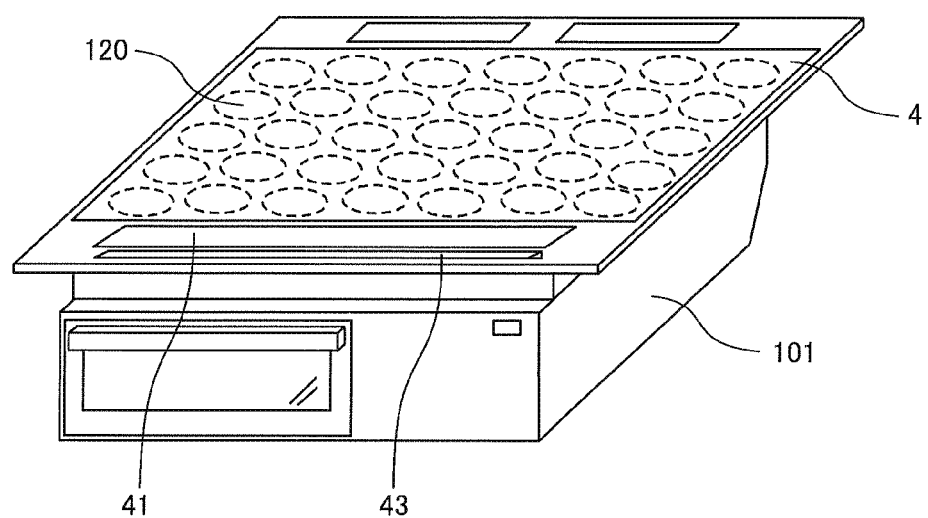
FIG. 25 is a perspective view showing a schematic configuration of an induction heating cooking apparatus according to Embodiment 4.

FIG. 25 is a perspective view showing a schematic configuration of an induction heating cooking apparatus according to Embodiment 4.

As shown in FIG. 25, in an induction heating cooking apparatus 101 according to Embodiment 4, a plurality of heating coils 120 having a relatively small size are disposed below the top plate 4 in a substantially uniformly dispersed manner.

Each of the plurality of heating coils 120 is individually driven by the drive circuit 50. The configuration of the drive circuit 50 that drives the heating coil 120 is substantially the same as the configuration of the drive circuit 50a in Embodiment 1 described above, for example.

Further, the control unit 45 in Embodiment 4 determines a material forming the heating target 5 loaded on the upper part of each of the plurality of heating coils 120. The material determination process is the same as that in Embodiment 1 described above.

Embodiment 4 may have a configuration where marks for heating zones are not provided on the top plate 4. The number of heating coils 120 may be the arbitrary number. Further, the layout of the heating coils 120 is not limited to the above. The heating coils 120 may be arranged in a honeycomb shape, or the heating coils 120 having a large size and the heating coils 120 having a small size may be arranged in a mixed manner.

(Action)

When a user loads the heating target 5 at a desired position on the top plate 4, and instructs the operation and display unit 43 to start heating, the material determiner 46 of the control unit 45 performs a material determination process. In the material determination process, the material determiner 46 determines a material forming the heating target 5 loaded on the upper part of each of the plurality of heating coils 120 by an action substantially the same as the action in Embodiment 1 described above.

In the case where, at least one heating coil out of the plurality of heating coils 120 having the upper part on which the heating target 5 formed by the material that is a magnetic material is loaded is positioned between two heating coils out of the plurality of heating coils 120 having the upper parts on which the heating target 5 formed by the material at least including a nonmagnetic material is loaded, the material determiner 46 determines that the material forming the heating target 5 is a composite.

In the case where the material forming the heating target 5 is a composite, in the same manner as in Embodiment 1 described above, the control unit 45 sets the frequency of a high-frequency current supplied to the heating coils 120 having the upper parts on which the heating target 5 formed by the material at least including a nonmagnetic material is loaded higher than the frequency of a high-frequency current supplied to the heating coil 120 having the upper part on which the heating target 5 formed by the material that is a magnetic material is loaded.

In the heating action, the control unit 45 may alternately switch the action between the first action and the second action in the same manner as in Embodiment 2 described above. Further, in the heating action, the control unit 45 may alternately switch the action between the third action and the fourth action in the same manner as in Embodiment 3 described above.

Also with the above-described configuration, in the same manner as in Embodiments 1 to 3 described above, in inductively heating the heating target 5 made of a composite, it is possible to perform induction heating suitable for the material forming the heating target 5 so that nonuniformity in a heating temperature of the heating target 5 can be reduced.

Further, the heating target 5 can be placed at an arbitrary position on the top plate 4, so that user-friendliness can be improved.

The invention claimed is:

1. An induction heating cooking apparatus, comprising:
a plurality of heating coils aligned in at least one row on a flat surface;
a plurality of inverter circuits each configured to supply a high-frequency current to a corresponding one of the plurality of heating coils;
a material determiner configured to determine a material forming a heating target loaded on an upper part of each of the plurality of heating coils; and
a controller configured to control driving of the plurality of inverter circuits on a basis of a result determined by the material determiner, wherein:
the plurality of heating coils includes a first heating coil and a second heating coil that are adjacent to each other, the material determiner makes a first determination that the heating target is loaded on the upper part of the first heating coil and the upper part of the second heating coil, the material determiner makes a second determination that the material forming the heating target loaded on the upper part of the first heating coil at least includes a nonmagnetic material, and that the material forming the heating target loaded on the upper part of the second heating coil is a magnetic material, and based on the material determiner making the first determination and the second determination, the controller is configured to:

set a frequency of the high-frequency current supplied to the first heating coil higher than a frequency of the high-frequency current supplied to the second heating coil, and alternately switch an action between an action of stopping supply of the high-frequency current to the first heating coil, and of supplying the high-frequency current to the second heating coil and an action of stopping supply of the high-frequency current to the second heating coil, and of supplying the high-frequency current to the first heating coil.

2. The induction heating cooking apparatus of claim 1, wherein at least one heating coil out of the plurality of heating coils having the upper part on which the heating target formed by the material that is the magnetic material is loaded is positioned between two heating coils out of the plurality of heating coils having the upper parts on which the heating target formed by the material at least including the nonmagnetic material is loaded, and the controller is configured to set the frequency of the high-frequency current supplied to the two heating coils having the upper parts on which the heating target formed by the material at least including the nonmagnetic material is loaded higher than the frequency of the high-frequency current supplied to the at least one heating coil having the upper part on which the heating target formed by the material that is the magnetic material is loaded.

3. The induction heating cooking apparatus of claim 2, wherein the controller is configured to switch an action between an action of stopping supply of the high-frequency current to the two heating coils having the upper parts on which the heating target formed by the material at least including the nonmagnetic material is loaded, and of supplying the high-frequency current to the at least one heating coil having the upper part on which the heating target formed by the material that is the magnetic material is loaded and an action of supplying the high-frequency current to the two heating coils having the upper parts on which the heating target formed by the material at least including the nonmagnetic material is loaded, and of stopping supply of the high-frequency current to the at least one heating coil having the upper part on which the heating target formed by the material that is the magnetic material is loaded.

4. The induction heating cooking apparatus of claim 2, wherein the controller is configured to switch an action between an action of supplying the high-frequency current at a frequency corresponding to the magnetic material to the two heating coils having the upper parts on which the heating target formed by the material at least including the nonmagnetic material is loaded, and to the at least one heating coil having the upper part on which the heating target formed by the material that is the magnetic material is loaded and an action of supplying the high-frequency current at a frequency corresponding to the nonmagnetic material or to a material including the magnetic material and the nonmagnetic material to the two heating coils having the upper parts on which the heating target formed by the material at least including the nonmagnetic material is loaded, and to the at least one heating coil having the upper part on which the heating target formed by the material that is the magnetic material is loaded.

5. The induction heating cooking apparatus of claim 1, wherein the plurality of heating coils have an identical shape and an identical size.

6. The induction heating cooking apparatus of claim 1, wherein each of the plurality of heating coils is formed in an elliptical shape as viewed in a plan view, and minor axes of the plurality of heating coils aligned in one row are aligned on one straight line.

7. The induction heating cooking apparatus of claim 6, wherein the plurality of heating coils are arranged in such a manner that an interval between two heating coils that are adjacent to each other is smaller than a half of a length of the minor axis of the heating coil.

8. The induction heating cooking apparatus of claim 1, comprising a top plate on which the heating target is to be loaded, wherein the plurality of heating coils are disposed below the top plate in a uniformly dispersed manner.

9. The induction heating cooking apparatus of claim 1, wherein a switching element of each of the plurality of inverter circuits is made of a wide-bandgap semiconductor material.

* * * * *